United States Patent [19]

Morita et al.

[11] Patent Number: 5,537,638
[45] Date of Patent: Jul. 16, 1996

[54] METHOD AND SYSTEM FOR IMAGE MAPPING

[75] Inventors: Toyohisa Morita; Yuri Takizawa; Makoto Kato, all of Yokohama; Shinichiro Miyaoka, Kawasaki, all of Japan

[73] Assignee: Hitachi, Ltd., Tokyo, Japan

[21] Appl. No.: 964,293

[22] Filed: Oct. 20, 1992

[30] Foreign Application Priority Data

Oct. 25, 1991 [JP] Japan .................................. 3-279263
Dec. 20, 1991 [JP] Japan .................................. 3-338167

[51] Int. Cl.⁶ .............................. G06T 7/40; G06T 15/50
[52] U.S. Cl. ........................ 395/125; 395/126; 395/130; 395/131
[58] Field of Search ................................ 395/125, 126, 395/127, 130, 131, 161

[56] References Cited

U.S. PATENT DOCUMENTS

| | | | |
|---|---|---|---|
| 4,825,391 | 4/1989 | Merz | 395/131 X |
| 4,888,713 | 12/1989 | Falk | 395/125 |
| 5,003,496 | 3/1991 | Hunt, Jr. et al. | 395/130 |
| 5,058,040 | 10/1991 | Tajima | 395/131 |
| 5,146,557 | 9/1992 | Yamrom et al. | 395/161 |
| 5,255,352 | 10/1993 | Falk | 395/125 |
| 5,255,360 | 10/1993 | Peaslee et al. | 395/130 X |
| 5,276,798 | 1/1994 | Peaslee et al. | 395/130 X |

FOREIGN PATENT DOCUMENTS 63-293676 of 0000 Japan .
63-237172 of 0000 Japan .
03-41570 of 0000 Japan .

OTHER PUBLICATIONS

Klinker et al., "The Measurement of Highlights in Color Images" International Journal of Computer Vision, 2, 7–32, 1988.

Fishkin et al. "A Family of New Algorithms for Soft Fillwg", Computer Graphics, vol. 18. No. 3, Jul. 1984, pp. 235–244.

Ito, Fumiko, et al. "Texture Simulation System in Consideration of Simplicity and Reality", 39th (latter half of the first year of Heisei) National Convention of Information Processing Society of Japan, pp. 2250–2251. (Provided in Japanese).

*Primary Examiner*—Mark K. Zimmerman
*Attorney, Agent, or Firm*—Fay, Sharpe, Beall, Fagan, Minnich, & McKee

[57] ABSTRACT

A first image is inputted, and an object area for mapping is determined on the first image. Transformation parameters for the mapping are calculated pixel by pixel from the attributes of the first image in the object area, a second image to be mapped into at least one part of the object area is generated, and the second image is mapped pixel by pixel in the object area of the first image operating the transformation parameters so as to generate a third image. When an image simulation for changing the color and texture in an area of a color or monochromatic gray scale image is performed, an image simulation for ignoring effects of fine texture on the initial image and reflecting the shadow and shade can be realized. When the same texture image is mapped one after another in a plurality of areas on a projection of a perspectively projected three-dimensional space which are originally on the same plane in the original three-dimensional space, by calculating the coordinate values on the projection for setting the parameters for projection transformation from the coordinate values of a smaller number of points, the operator's job of extracting coordinates values can be reduced.

15 Claims, 11 Drawing Sheets

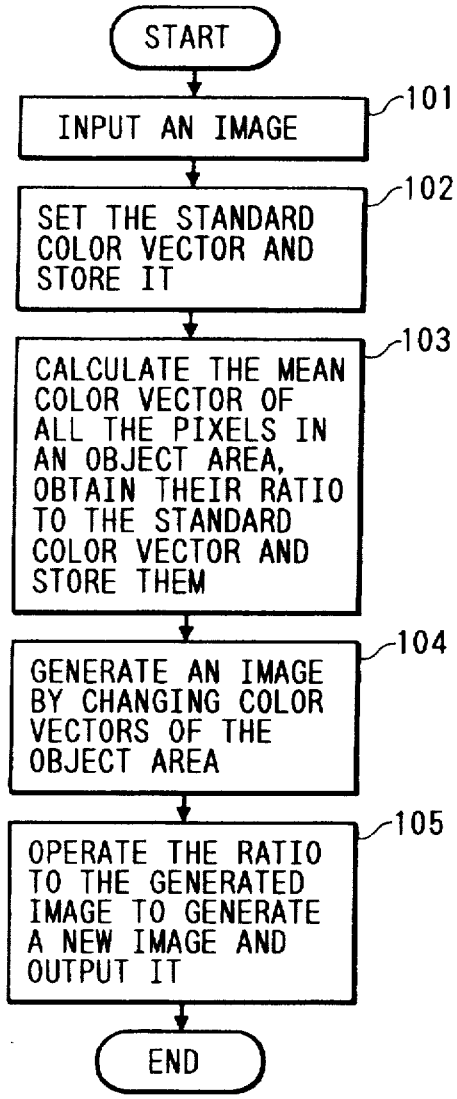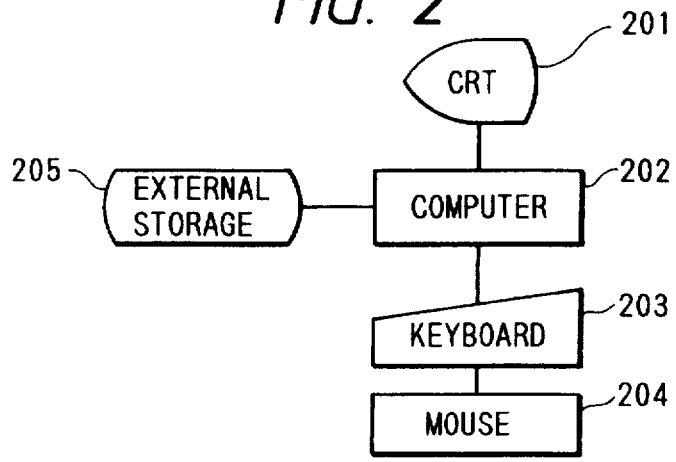

401
OBJECT AREA

501 OBJECT AREA

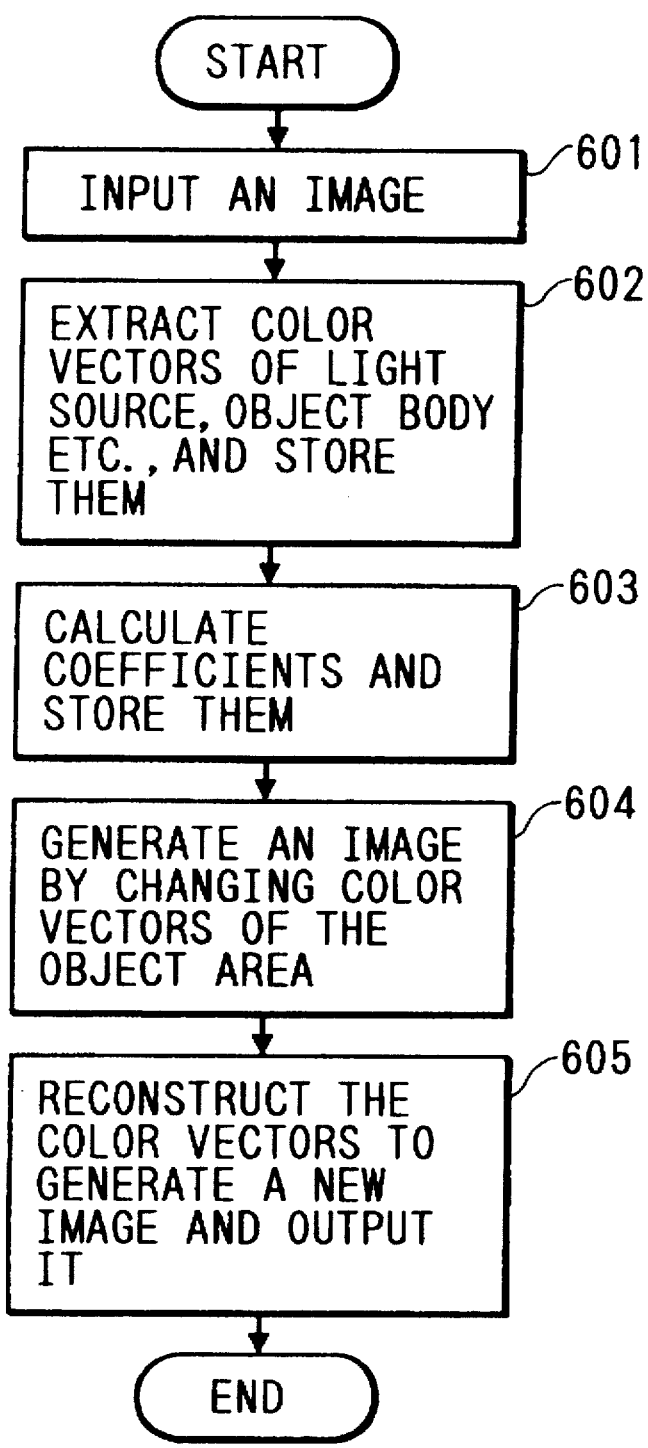

METHOD AND SYSTEM FOR IMAGE MAPPING

BACKGROUND OF THE INVENTION

1. Field of the Invention

The present invention relates to a method and system for image mapping for generating composite images by mapping images. More specifically, the invention relates to a method for simulating high-quality images for color or monochromatic gray scale images or for calculating the position information of grid points found on images or photographs and a method and system for texture mapping.

2. Description of the Prior Art

There are two types of prior arts of the present invention; that is, particularly one relates to the aforementioned image simulation and the other relates to texture mapping. Firstly, the prior art of image simulation will be described.

An image simulation art for reading an image in a computer as data and for changing colors and patterns in a specific area using the image processing art so as to produce an image indicating a quite different scene is required in the design and presentation fields at present.

In this case, as mentioned in Japanese Patent Laid-Open No. 63-293676 (hereinafter referred to as Prior Art 1), by separating an inputted color image into an intensity component and a color component, processing at least the color component among them, and composing and outputting it with the intensity component, a simulation reflecting the shadow and shade originally existing in the object body in an image can be performed.

Furthermore, as mentioned in Japanese Patent Laid-Open No. 63-237172 (hereinafter referred to as Prior Art 2) or Japanese Patent Laid-Open No. 3-41570 (hereinafter referred to as Prior Art 3), by extracting object body color vectors and light source color vectors in a specific area of an inputted color image from the pixel color vectors in the above area, by expressing the color vectors of all the pixels in the above area in a vector linear combination of the object body color vectors and light source color vectors, and by changing the object body color vectors and light source color vectors so as to reconstruct the color vectors, a high-quality simulation including the shadow and shade and the reflected section can be performed.

The following problems are imposed by the above prior art.

(1) When a full color image is separated into an intensity component and a color component and the color component is changed and then recomposed with the intensity component, the texture which originally exists in the initial image is passed to the intensity component and reflected to the final composite image. This method is effectual in an application with the intention of additionally reflecting the initial texture to the composite image, though it cannot satisfy the needs to change the fine texture of the initial image to a different texture and to reflect only the information of shadow and shade of the initial image to the result. The information of shadow and shade mentioned above indicates a distribution of brilliance which is generated on the surface of an object body by a shadow generated because a light beam irradiated onto the object body is blocked off or weakened or by a shade caused by changes in the received light intensity depending on the angle between the light beam and the surface of the object body or a distribution of brilliance caused by a multiformal distribution of light intensity generated because an originally sharp light beam is spread by refraction of the light beam which passes through some other objects and by scattering of the light beam which strikes some other objects.

(2) When the reflection of the information of shadow and shade is limited to a reference to the intensity component, the following problems are caused.

(2-1) There is a possibility that the information of object body colors which is independent of the information of shadow and shade is also included in the information of shadow and shade at the time of simulation and the information of shadow and shade cannot be reproduced precisely.

(2-2) Since the information of light source colors cannot be obtained, differences in the shadow and shade caused by a different color light source cannot be reproduced precisely.

(3) Application of the simulation method that a full color image is separated into an intensity component and the color component is changed and then recomposed with the intensity component to a gray scale image cannot be realized because the gray scale image is the intensity component itself, so that information other than the intensity component cannot be extracted.

(4) By a method for simulating an image by extracting object body color vectors and light source color vectors in a specific area of an inputted color image from the pixel color vectors in the above area, by expressing the color vectors of all the pixels in the above area in a vector linear combination of the object body color vectors and light source color vectors, and by changing the object body color vectors and light source color vectors so as to reconstruct the color vectors, a simulation for changing the texture to a texture which is not monochromatic cannot be performed because the unique object body color vector is given to the object area.

(5) Unless the condition that the object area has a unique object body color is satisfied, vectors cannot be extracted. Therefore, an area including a texture which is not monochromatic cannot be simulated.

Next, the prior art of texture mapping will be described. To extract the position information of an arbitrary point on an image, a point which moves depending on the input information is superimposed on the image and the position information of the extracting point is extracted from the input information of the movable point when the movable point is overlaid with the extracting point. To extract the coordinate value of an arbitrary point on a digital image of a computer, the object image is generally displayed on the display unit, and the mouse cursor is superimposed on it, and the mouse cursor is moved by moving the mouse, and the input coordinate value of the mouse when the mouse coincides with the extracting point is taken as a coordinate value of the point. Hereinafter, extraction of a coordinate value on the above principle is called "direct extraction by mouse". However, a trackball, light pen, touch panel, or digitizer is used as an input unit of a computer other than a mouse and the same operation can be performed by any of them. Therefore, this operation is not restricted only to a mouse.

In F. Ito and others, "Texture Simulation System in Consideration of Simplicity and Reality", 39th (latter half of the first year of Heisei) National Convention of Information Processing Society of Japan (hereinafter referred to as Prior Art 4), a method is described that in the texture mapping for composing a texture image, in order to compose a texture image so that it matches the composition of a projection of a perspectively projected three-dimensional space, the coordinate values of the vertexes of the corresponding tetragons on the two images of the texture image and the projection are directly extracted by the mouse or another means, and the parameters for projection transformation between the two images are calculated from those coordinate values, and the texture image is transformed and composed by this projection transformation.

Furthermore, in the above Prior Art 4, a method is described that in the texture mapping for composing the first image with the second image, the contour of the area wherein the texture mapping is performed on the first image is determined by the direct extraction by the mouse or another means so as to restrict the range for texture mapping.

The following problems are imposed by the above prior art. A problem (Problem 1) in a method that necessary points are all extracted directly by the mouse or another means so as to extract the position information of an arbitrary point on an image will be described hereunder. For example, even when there is a regularity among the position information contents of some extracting points, this method requires the same procedure to be performed repeatedly at all the necessary points and the operator's job becomes enormous when there are a large number of points. Furthermore, since an independent procedure is used to extract each position information in this case, the original regularity of position information is ignored.

Another problem (Problem 2) in a method that in the texture mapping for composing a texture image for a projection of a perspectively projected three-dimensional space, the coordinate values of the vertexes of the corresponding tetragons on the two images of the texture image and the projection are directly extracted by the mouse or another means, and the parameters for projection transformation between the two images are calculated from those coordinate values, and the texture image is transformed and composed by this projection transformation will be described hereunder. For example, even when there is a regularity among the coordinate values of a plurality of extracting points when the same texture image is mapped one after another in a plurality of areas on the projection on the same plane in the three-dimensional space, this method requires the same procedure to be performed repeatedly at all the necessary points and the operator's job becomes enormous when there are a large number of points.

Furthermore, since an independent procedure is used to extract each coordinate value in this case, the original regularity of coordinate values is ignored. A further problem (Problem 3) in a method that in the texture mapping for composing the first image with the second image, the contour of the area wherein the texture mapping is performed on the first image is determined by the direct extraction by the mouse or another means so as to restrict the range for texture mapping will be described hereunder. Since the range for the second image is not restricted in this method, it is necessary to prepare an image wherein every pixel can be subjected to texture mapping. Furthermore, in a method that the contour of the area is specified when the range of first image texture mapping is restricted, when setting whether or not to perform texture mapping arbitrarily for each pixel on the first image, the specification of the area is very complicated and the operator's job becomes enormous.

SUMMARY OF THE INVENTION

The first object of the present invention is to provide an image simulation method for ignoring effects of the fine texture on the initial image so as to reflect the shadow and shade when an image simulation for changing the color and texture in an area on a color or monochromatic gray scale image is performed.

The second object of the present invention is to provide an image simulation method for precisely reproducing the shadow and shade free of effects of the object body colors when an image simulation for changing the colors and texture in an area on a color or monochromatic gray scale image by reflecting the shadow and shade on the initial image is performed.

The third object of the present invention is to provide an image simulation method for precisely reproducing differences in the light source colors when an image simulation for changing the colors and texture in an area on a color image by reflecting the shadow and shade on the initial image is performed.

The fourth object of the present invention is to provide an image simulation method for changing the texture of a specific area on a color image to a texture which is not monochromatic reflecting the shadow and shade and reflection of the initial image.

The fifth object of the present invention is to provide an image simulation method for changing the texture of a specific area including the texture which is not monochromatic on a color image reflecting the shadow and shade and reflection of the initial image.

The sixth object of the present invention is to provide a method for extracting, when obtaining the position information of grid points on the perspective projection which are originally on a plane in a three-dimensional space, the position information of a smaller number of grid points by the mouse or another means instead of extracting the position information of all the object grid points by the mouse or another means and for calculating the position information of the residual points so that it matches the composition of the perspective projection.

The seventh object of the present invention is to provide a texture mapping method for extracting, when in the texture mapping for composing with a texture image by projection transformation for a perspective projection of a three-dimensional space, the same texture image is mapped one after another in a plurality of areas on the projection which are originally on the same plane in the three -dimensional space and the coordinate values of the four points corresponding to the areas on the projection which are necessary for setting parameters for projection transformation in each area are obtained, the coordinate values of a smaller number of points are extracted by the mouse or another means instead of extracting the coordinate values of each four points on the projection in all the areas by the mouse or another means and for calculating the coordinate values of the residual points so that they match the composition of the perspective projection. Furthermore, the seventh object of the present invention is also to provide a texture mapping method for changing a composition wherein texture images are lined up excessively artificially in good order to a natural composition, though the coordinate values on the projection which match the composition of the perspective projection can be calculated by this texture mapping. Furthermore, the seventh object of the present invention is also to provide a texture mapping method for correcting variations in the above calculated coordinate values from the true position on the projection which may be caused by errors by direct extraction by the mouse or another means, image distortion, or grid points which are not located precisely on the same plane in the original three-dimensional space so as to realize more precise mapping.

The eighth object of the present invention is to provide a texture mapping method for easily controlling, in the texture mapping for composing the first image with the second image, whether or not to perform texture mapping for each pixel in at least one of the first and second images.

To accomplish the above objects, in a system having an image input means, an image output means, a processor, and a means for transforming and mapping images, the present invention presents an image mapping method and system, wherein a first image is inputted, and the object area for mapping is determined on the first image, and the transformation parameters necessary for the above mapping are calculated from the attribute of the image in the above object area, and a second image for mapping to at least one part of the above object area is generated, and the second image is mapped in the above object area of the first image operating the above transformation parameters so as to generate a third image.

Next, the above characteristics will be described for the aforementioned image simulation method and system. In the above system, a first image is inputted, and the standard color vector in the object area of the first image for simulation is determined, and the mean color vectors are calculated in the neighborhood of all the pixels in the above object area, and the ratio of each of them to the above standard color vector in each component is calculated for each pixel, and a second image wherein the color vectors of at least one part of the pixels in the above object area are changed is generated, and as for each pixel in the above object area, the color vector of the corresponding pixel of the second image is operated with the above ratio corresponding to each of the pixels in each component, and it is assumed as the color vector of the corresponding pixel so as to generate a third image, and the third image is outputted.

Furthermore, the above characteristics will be described for the aforementioned texture mapping method and system. In the above system, a perspective projection in a three-dimensional space including at least a plane is inputted as a first image, and when the first image is a repetitive pattern of a plurality of same image areas on the same plane in the three-dimensional space before transforming the first image to the above perspective projection, the parameters for projection transformation to the above three-dimensional space in each area are calculated from the coordinate values on the plane and the projection of four points in at least one area is generated, and a second image for mapping to the above plurality of areas is generated, and the second image is mapped in the above object areas of the first image operating the above transformation parameters so as to generate a third image.

Next, the above characteristics will be outlined for each of the first object to the eighth object.

To accomplish the first object, according to the present invention, the standard color vector in the area of the initial image for simulation is determined, and the mean color vectors are calculated in the neighborhood of all the pixels in the above area, and the ratio of each of them to the above standard color vector in each component is calculated for each pixel, and the ratio is used as information of the shadow and shade for image simulation. Furthermore, to apply the above ratio also to gray scale images in the same way as color images, the information of shadow and shade is expressed in a ratio of each color vector to the standard color vector in each component instead of the intensity of each color vector. The standard color vector mentioned above indicates a color vector representing the part which has the same color vector distribution as that in the object area in the image and is considered as free of shadow and shade because it is fully exposed to light.

To accomplish the second object, the information of shadow and shade is expressed in a ratio of each color vector to the standard color vector in each component instead of the intensity of each color vector.

To accomplish the third object, the information of shadow and shade is expressed in a color model of three independent components.

To accomplish the fourth object, when an image simulation for changing a specific area on a color image reflecting the shadow and shade and reflection of the initial image is performed, the object body color after changing is not monochromatic and color vectors are varied with pixels.

Furthermore, to accomplish the fifth object, when an image simulation for changing an area including a texture which is not monochromatic on a color image reflecting the shadow and shade and reflection of the initial image is performed, the average processing is performed for the initial image beforehand.

To accomplish the sixth object, from the grid structure on the plane in a three-dimensional space, the position information on the plane of four grid points, and the position information on the projection of the above four points, the parameters for projection transformation from the plane to the projection are calculated and the position information of every grid point on the projection projected from the plane is calculated.

To accomplish the seventh object, the coordinate values of four points on the projection corresponding to each area which are necessary for setting the parameters for projection transformation in each area are calculated from the coordinate values on the plane of the above four points and the coordinate values on the plane and the projection of a set of four points which are unrelated to any area. Furthermore, after the coordinate values necessary for setting the parameters for projection transformation are calculated, the coordinate values are disturbed by disturbance and the resultant coordinate values are used for setting the parameters for projection transformation. Furthermore, after the coordinate values necessary for setting the parameters for projection transformation are calculated, the true positions are searched around the calculated coordinate values and the resultant coordinate values are used for setting the parameters for projection transformation.

Furthermore, to accomplish the eighth object, the system has data wherein information on whether or not to perform texture mapping for each pixel in at least one of the first and second images is described and judges whether or not to perform texture mapping by referring to it.

According to the present invention, since the standard color vector in the object area for simulation of the initial image is determined, and the mean color vectors are calculated in the neighborhood of all the pixels in the above area, and the ratio of each of them to the above standard color vector in each component is calculated for each pixel, the fine texture of the object body surface shown in the above area is canceled by averaging and an effect of the shadow and shade which is independent of the texture can be extracted, so that an image simulation which ignores the effect of the fine texture of the initial image and reflects the shadow and shade can be performed.

Furthermore, from the grid structure on the plane in a three-dimensional space, the position information on the plane of four grid points, and the position information on the projection of the above four points, the parameters for projection transformation from the plane to the projection are calculated and the position information of every grid point on the projection projected from the plane is calculated.

Furthermore, since the position information of every grid point on the plane which is projected on the projection can be calculated from the position information of a smaller number of grid points, the operator's job is reduced. Furthermore, position information which matches the composition of the perspective projection can be obtained.

Furthermore, when four points on the plane correspond to four points on the projection, and the mapping destination consists of a plurality of areas originally on the same plane in the three-dimensional space, and the coordinate value of a certain point is necessary for setting the parameters for projection transformation in each area, the coordinate value on the projection can be easily obtained.

Furthermore, after the coordinate value necessary for setting the parameters for projection transformation is calculated, the coordinate value can be disturbed by disturbance so as to use the resultant coordinate value for setting the parameters for projection transformation.

Furthermore, the true positions are searched around the calculated point on the projection. When the true position is a feature point on the projection which can be extracted by image processing, a space filter, which is suitable for extracting it, is produced and operated by changing the position thereof near the point, and the coordinate value of the position with a high correlative value obtained by the template matching operation is taken as a true value.

Furthermore, by holding data wherein information on whether or not to perform texture mapping for each pixel in at least one of the first and second images is described and judging whether or not to perform texture mapping for each pixel by referring to it, whether or not to perform texture mapping can be controlled for each pixel in one of the first and second images and whether or not to perform texture mapping can be controlled for each pixel also in both first and second images.

The foregoing and other objects, advantages, manner of operation and novel features of the present invention will be understood from the following detailed description when read in connection with the accompanying drawings.

FIG. 1 is a flow chart showing the processing procedure of the first embodiment of the image simulation method of the present invention;

FIG. 2 is a block diagram of the hardware;

FIG. 4 is a diagram for explaining a method for generating an image by texture mapping.

Figure 5A:
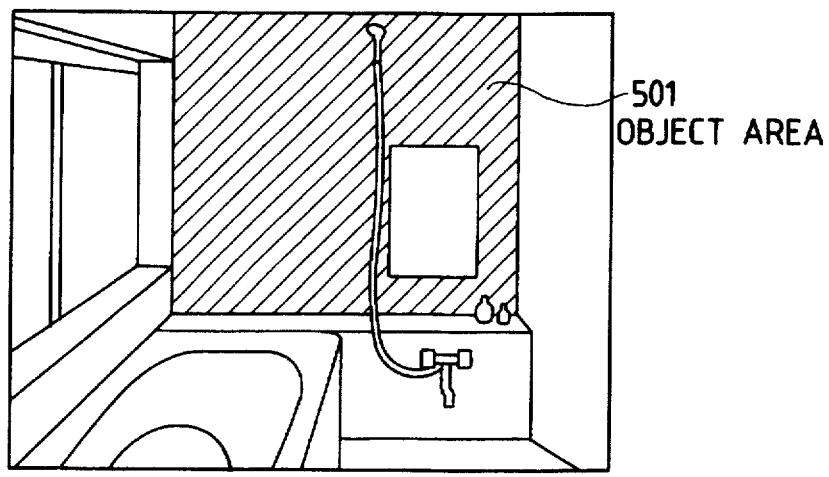
Figure 5B:
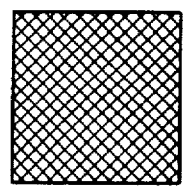
Figure 5C:
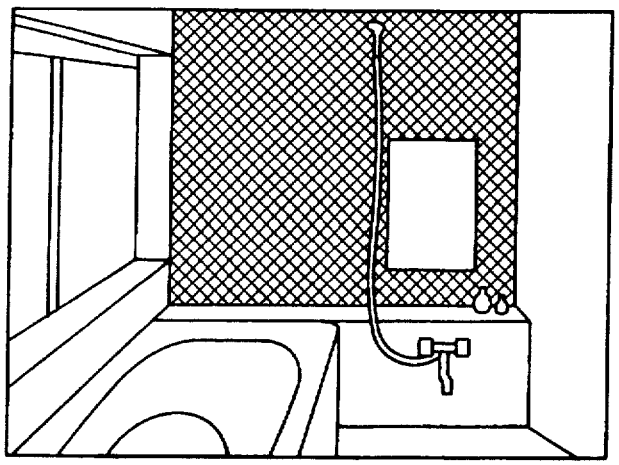
Figure 7A:
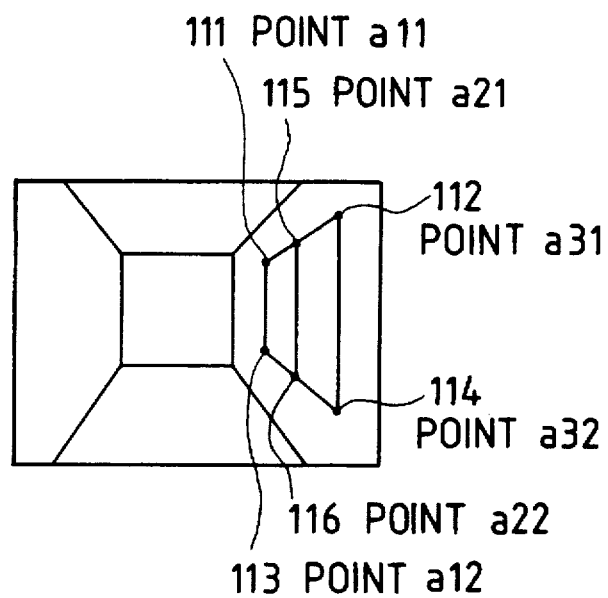
Figure 8:
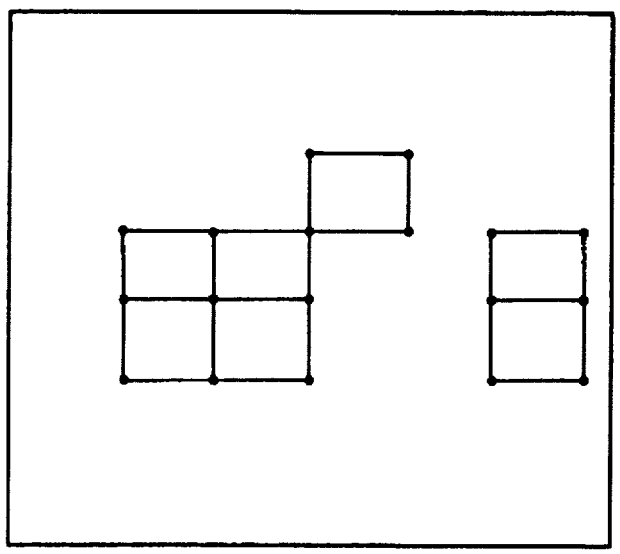
Figure 9:
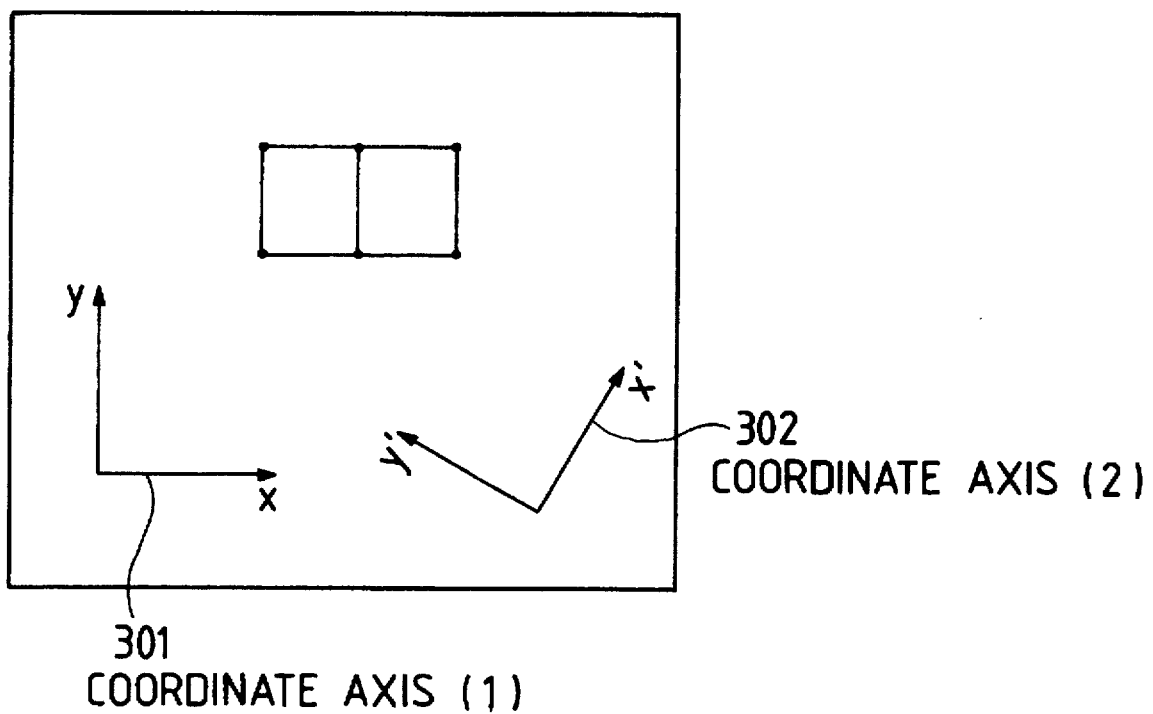
Figure 10A:
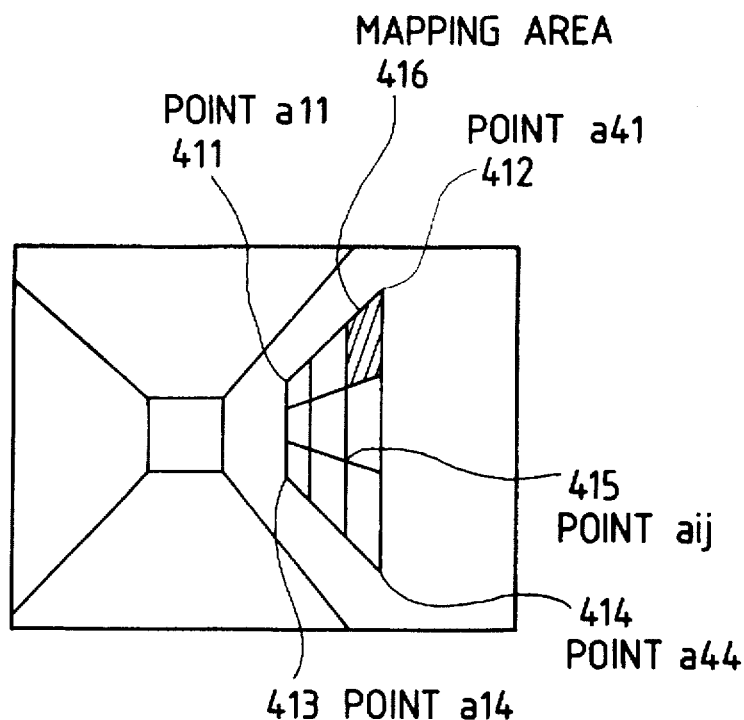
Figure 11:
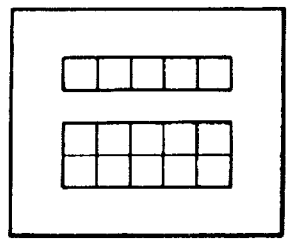
Figure 12:
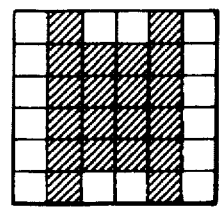
Figure 16:
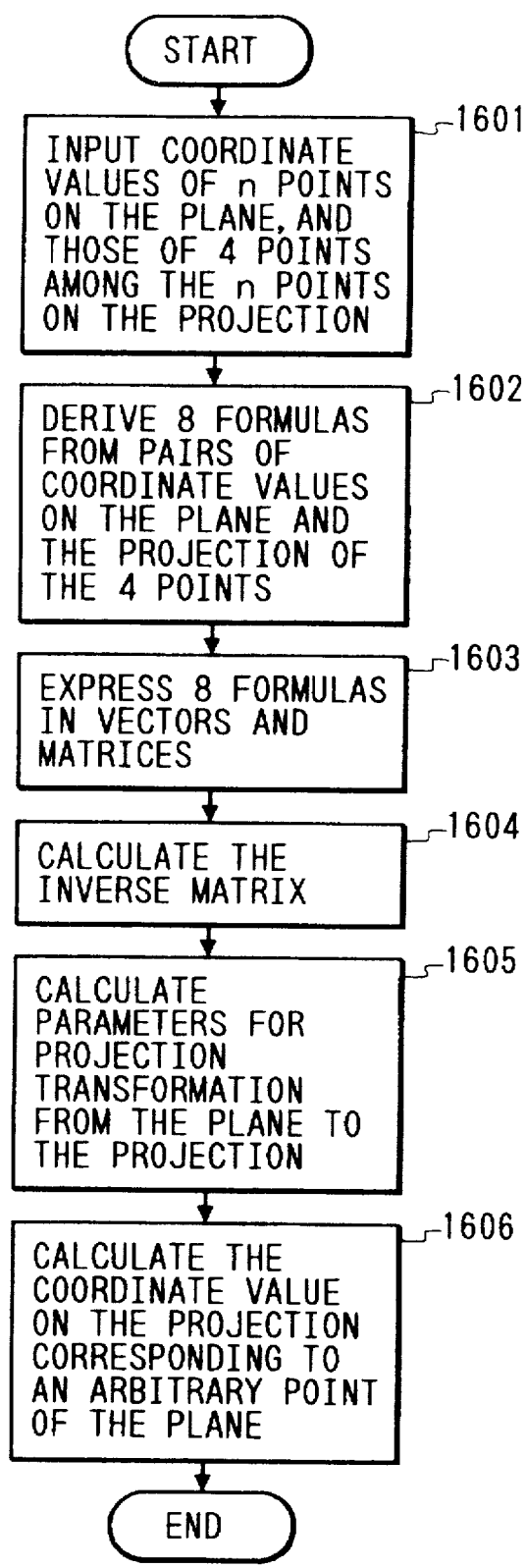

FIG. 5(a) is a drawing for explaining the object area of this embodiment; FIG. 5(b) shows a selected color pattern; FIG. 5(c) shows the object area with the selected color pattern;

FIG. 6 is a flow chart showing the processing procedure of a transformed embodiment of the image simulation method of the present invention;

FIG. 7(a) and (b) is an illustration of the second embodiment of the grid point calculation method of the present invention;

FIG. 8 is a drawing for explaining that the grid structure is not restricted in the embodiment of the grid point calculation method of the present invention;

FIG. 9 is a drawing for explaining that the coordinate setting method on the plane is not restricted in the embodiment of the grid point calculation method of the present invention except the condition that the coordinate space is a linear space;

FIG. 10(a), (b), and (c) is an illustration of an embodiment of the texture mapping method of the present invention;

FIG. 11 is a drawing for explaining that the mapping area existing conditions are not restricted in the embodiment of the texture mapping method of the present invention;

FIG. 12 is a drawing showing an example of a matrix for searching for the true position around the calculated coordinate value in the embodiment of the texture mapping method of the present invention;

FIG. 13(a)–(d) is a drawing for explaining a method for controlling whether or not to perform texture mapping for each pixel on the second image when performing texture mapping of the second image onto the first image in the embodiment of the texture mapping method of the present invention;

FIG. 14(a)–(d) is a drawing for explaining a method for controlling whether or not to perform texture mapping for each pixel on the first image when performing texture mapping of the second image onto the first image in the embodiment of the texture mapping method of the present invention;

FIG. 15(a)–(f) is a drawing for explaining a method for controlling whether or not to perform texture mapping for each pixel on both the first and second images when performing texture mapping of the second image onto the first image in the embodiment of the texture mapping method of the present invention; and FIG. 16 is a flow chart showing the processing procedure of the main parts in the embodiment of the texture mapping method of the present invention.

DETAILED DESCRIPTION OF THE PREFERRED EMBODIMENTS

[First embodiment]

Next, the basic concepts of the image simulation method and system of the first embodiment will be explained.

The object image is assumed as a color image and an RGB color model will be considered. Assuming the color vector of a pixel P $(x, y)$ on the image as $C(x, y)$, $C(x, y)$ is generally expressed by Formula 1.

$$C(x, y) = \begin{bmatrix} R(x, y) \\ G(x, y) \\ B(x, y) \end{bmatrix} \quad (1)$$

where $R(x, y)$, $G(x, y)$, and $B(x, y)$ are scalars indicating the R component, G component, and B component of $C(x, y)$ respectively.

Next, the standard color vector of the object area is assumed as Co (Formula 2).

$$Co = \begin{bmatrix} Ro \\ Go \\ Bo \end{bmatrix} \quad (2)$$

where Ro, Go, and Bo are scalars indicating the R component, G component, and B component of Co respectively.

Next, the neighborhood of the pixel P (x, y) in the object area for simulation when the color vectors are averaged near the pixel P (x, y) is represented by a set of pixels $\epsilon$ (x, y). The number of pixels contained in $\epsilon$ (x, y) is represented by N (x, y).

In this case, the mean color vector in the range $\epsilon$ (x, y) near the pixel P (x, y) is represented by a vector Ca (x, y) of Formula 3.

$$Ca\ (x, y) = \begin{bmatrix} Ra\ (x, y) \\ Ga\ (x, y) \\ Ba\ (x, y) \end{bmatrix} \quad (3)$$

where Ra (x, y), Ga (x, y), and Ba (x, y) are scalars indicating the R component, G component, and B component of Ca (x, y) respectively. The components of Ra (x, y), Ga (x, y), and Ba (x, y) are represented by Formula 4, Formula 5, and Formula 6.

$$Ra\ (x, y) = \frac{1}{N(x, y)} \sum_{P(i,j)\in \epsilon(x,y)} R\ (i, j) \quad (4)$$

$$Ga\ (x, y) = \frac{1}{N(x, y)} \sum_{P(i,j)\in \epsilon(x,y)} G\ (i, j) \quad (5)$$

$$Ba\ (x, y) = \frac{1}{N(x, y)} \sum_{P(i,j)\in \epsilon(x,y)} B\ (i, j) \quad (6)$$

where a symbol i indicates an index for representing the x coordinate and a symbol j indicates an index for representing the y coordinate.

Next, the ratio of the vector Ca to the standard color vector Co in each component is taken as a vector F (x, y) (Formula 7).

$$F\ (x, y) = \begin{bmatrix} Rf(x, y) \\ Gf(x, y) \\ Bf(x, y) \end{bmatrix} \quad (7)$$

where Rf (x, y), Gf (x, y), and Bf (x, y) are scalars indicating the R component, G component, and B component of F (x, y) respectively. The components of Rf (x, y), Gf (x, y), and Bf (x, y) are represented by Formula 8, Formula 9, and Formula 10.

$$Rf(x, y) = \frac{Ra\ (x, y)}{Ro} \quad (8)$$

$$Gf(x, y) = \frac{Ga\ (x, y)}{Go} \quad (9)$$

$$Bf(x, y) = \frac{Ba\ (x, y)}{Bo} \quad (10)$$

where each component of F (x, y) is the ratio of the average color component when the fine color component variation near the pixel P (x, y) is canceled to the corresponding component of the standard color vector. Therefore, when the average color vector near the part which has the similar color vector distribution as that in the object area and has no shadow and shade because it is exposed fully to light is set as a standard color vector, each component of F (x, y) indicates the degree of shadow and shade thereof at the location.

Next, an image wherein the color vectors of all or a part of the pixels in this area are changed is generated or externally inputted and obtained.

The color vector of the pixel P (x, y) in the above object area of this new image is assumed as Cm (Formula 11).

$$Cm\ (x, y) = \begin{bmatrix} Rm\ (x, y) \\ Gm\ (x, y) \\ Bm\ (x, y) \end{bmatrix} \quad (11)$$

where Rm (x, y), Gm (x, y), and Bm (x, y) are scalars indicating the R component, G component, and B component of Cm (x, y) respectively.

To superimpose the above information of shadow and shade onto the pixel P (x, y), it is necessary to multiply Cm by the coefficient indicating the information of shadow and shade at the location in each component. The color vector obtained by simulation is assumed as Cr (x, y) (Formula 12).

$$Cr\ (x, y) = \begin{bmatrix} Rr\ (x, y) \\ Gr\ (x, y) \\ Br\ (x, y) \end{bmatrix} \quad (12)$$

where Rr (x, y), Gr (x, y), and Br (x, y) are scalars indicating the R component, G component, and B component of Cr (x, y) respectively.

In this case, the components of Rr (x, y), Gr (x, y), and Br (x, y) are represented by Formula 13, Formula 14, and Formula 15.

$$Rr(x, y) = Rf(x, y) \cdot Rm(x, y) \quad (13)$$

$$Gr(x, y) = Gf(x, y) \cdot Gm(x, y) \quad (14)$$

$$Br(x, y) = Bf(x, y) \cdot Bm(x, y) \quad (15)$$

By doing this, an image simulation which ignores effects of the fine texture on the initial image and reflects the shadow and shade can be performed.

Furthermore, according to the present invention, the information of shadow and shade is expressed in a ratio of each color vector to the standard color vector in each component instead of the intensity of each color vector, so that the information of object body color indicated in the object area can be separated from the information of shadow and shade in the area even on a gray scale image and a simulation can be performed by changing the information of object body color.

Next, the operation will be described in detail.

The object image is assumed as a gray scale image.

The intensity of the pixel P (x, y) on the image is assumed as g (x, y). A symbol g (x, y) is a scalar.

Next, the standard intensity of the object area is assumed as go. Also a symbol go is a scalar.

Next, the neighborhood of the pixel P (x, y) in the object area for simulation when the intensity is averaged near the pixel P (x, y) is represented by a set of pixels epsilon (x, y). The number of pixels contained in epsilon (x, y) is represented by N (x, y).

In this case, the mean intensity in the range epsilon (x, y) near the pixel P (x, y) is represented by ga (x, y).

A symbol ga (x, y) is a scalar and represented by Formula 16.

$$ga\ (x, y) = \frac{1}{N(x, y)} \sum_{P(i,j)\in \epsilon(x,y)} g\ (i, j) \quad (16)$$

where a symbol i indicates an index for representing the x coordinate and a symbol j indicates an index for representing the y coordinate.

Next, the ratio of ga (x, y) to the standard intensity go is taken as Fg (x, y) (Formula 17). A symbol Fg (x, y) is a scalar.

$$Fg\ (x, y) = \frac{ga\ (x, y)}{go} \quad (17)$$

where Fg (x, y) is the ratio of the average intensity when the fine intensity variation near the pixel P (x, y) is canceled to the standard intensity. Therefore, when the average intensity near the part which has the similar texture as that in the object area and has no shadow and shade because it is exposed fully to light is set as a standard intensity, Fg (x, y) indicates the degree of shadow and shade at the location.

Next, an image wherein the intensities of all or a part of the pixels in this area are changed is generated or externally inputted and obtained.

The intensity of the pixel P (x, y) in the above object area of this new image is assumed as gm. A symbol gm is a scalar.

To superimpose the above information of shadow and shade onto the pixel P (x, y), it is necessary to multiply gm (x, y) by the coefficient indicating the information of shadow and shade at the location. When the intensity obtained by simulation is assumed as gr (x, y), it is represented by Formula 18. A symbol gr (x, y) is a scalar.

$$gr(x, y) = Fg(x, y) \cdot gm(x, y) \tag{18}$$

By doing this, even for a gray scale image, an image simulation which ignores effects of the fine texture on the initial image and reflects the shadow and shade can be performed.

Furthermore, the above simulation method for a gray scale image is equivalent to the above simulation method for a color image wherein the number of color components is reduced from 3 to 1.

Furthermore, since the information of shadow and shade is expressed in a ratio of each color vector to the standard color vector in each component instead of the intensity of each color vector, only the information of shadow and shade can be extracted by separating the effect of the object body color indicated in the object area even on a color or monochromatic gray scale image and an image simulation for precisely reproducing the shadow and shade can be performed.

Next, the operation will be described in detail.

When an object body can be seen only by a diffusion component, intensity of the reflected light is generally represented by Formula 19 as described in Eihachiro Nakamae, "Computer Graphics", Ohm, Ltd., (1987), pp 136 and 137 (Prior Art. 5).

$$Id = Ip \cdot \cos \alpha \cdot Rd \tag{19}$$

where a symbol Id indicates the intensity of the reflected light, Ip the intensity of the parallel light, α the angle of incidence, and Rd the diffusion coefficient. Ip.cos alpha indicates the part of the Ip light which is irradiated perpendicularly to the corresponding surface and it is an intrinsic value for the directions of the object body surface and of the light, and the illumination. Since the intensity of the reflected light is represented by the product of the above value and Rd which is an intrinsic value of the object body surface, the degree of darkness due to the shadow and shade can be separated and represented by a form of multiplication in the reflected light. Furthermore, not only in the case of getting dark but also in the case of getting light, the degree of lightness can be described simultaneously in the same representation. Therefore, when the light intensity is distributed, Ip can be changed to the corresponding value and also separated and represented in the form of multiplication.

For a color image, the information of shadow and shade is represented by Formula 8, Formula 9, and Formula 10.

These represent the degree of darkness of the original object body color due to the shadow and shade for each component. Since the object body color and the degree of shadow and shade are separated in the form of product of the two in this embodiment, by multiplying another object body color by this degree of shadow and shade in each component, a simulation wherein the shadow and shade are precisely reproduced can be performed.

For a gray scale image, everything is the same except that the components are united into one.

Furthermore, according to the present invention, when color images are simulated, the information of shadow and shade is expressed in a color model of three independent components, so that the difference in the light source color can be reproduced precisely.

Next, the operation will be described in detail.

Since the information of shadow and shade is expressed in a color model of three independent components, the information of shadow and shade can be extracted and held and also a simulation can be executed independently for the three components as mentioned above. Therefore, a case that the initial image is a scene generated by irradiation of, for example, red light can be distinguished from a case that the initial image is a scene generated by irradiation of green light. Therefore, a simulation wherein the difference in the light source color is reproduced precisely can be performed.

Furthermore, according to the present invention, when a specific area on a color image is simulated reflecting the shadow and shade and reflection, the object body color after changing is not monochromatic in the area and color vectors can be varied with pixels. Therefore, a simulation for changing the texture of the object body surface shown in the area to a texture which is not monochromatic can be performed.

Next, the operation will be described in detail.

The object image is assumed as a color image and a RGB color model will be considered. Assuming the color vector of a pixel P (x, y) on the image as C (x, y), C (x, y) is generally expressed by Formula 20.

$$C(x, y) = \begin{bmatrix} R(x, y) \\ G(x, y) \\ B(x, y) \end{bmatrix} \tag{20}$$

where R (x, y), G (x, y), and B (x, y) are scalars indicating the R component, G component, and B component of C (x, y) respectively.

When an object body can be seen only by the specular reflection component and diffusive reflection component, a model wherein the color vector at each point is represented by a linear combination of the light source color and the object body color is available as described in Prior Art 2. Furthermore, when the reflected light cannot be decomposed into the above two components, a model wherein a vector is added to the above linear combination can be considered.

According to the above models, C (x, y) is represented by Formula 21.

$$C(x, y) = k0(x, y) C0 + k1(x, y) C1 + k2(x, y) C2 \tag{21}$$

where C0, C1, and C2 indicate an object body color vector, a light source color vector, and a variation color vector respectively and k0 (x, y), k1 (x, y), and k2 (x, y) indicate coefficients of the object body color vector, the light source color vector, and the variation color vector respectively. The above variation vector means an exterior product of the object body color vector and the light source color vector.

C0, C1, and C2 are represented by Formula 22, Formula 23, and Formula 24 respectively.

$$C0 = \begin{bmatrix} R0 \\ G0 \\ B0 \end{bmatrix} \tag{22}$$

$$C1 = \begin{bmatrix} R1 \\ G1 \\ B1 \end{bmatrix} \tag{23}$$

$$C2 = \begin{bmatrix} R2 \\ G2 \\ B2 \end{bmatrix} \quad (24)$$

where R0, G0, and B0 are scalars indicating the R component, G component, and B component of the object body color vector C0 respectively. Furthermore, R1, G1, and B1 are scalars indicating the R component, G component, and B component of the light source color vector C1 respectively. Furthermore, R2, G2, and B2 are scalars indicating the R component, G component, and B component of the variation color vector C2 respectively.

The above mentioned is represented by Formula 25.

$$C(x, y) = \begin{bmatrix} R(x, y) \\ G(x, y) \\ B(x, y) \end{bmatrix} \quad (25)$$

$$= \begin{bmatrix} R0 & R1 & R2 \\ G0 & G1 & G2 \\ B0 & B1 & B2 \end{bmatrix} \begin{bmatrix} k0(x, y) \\ k1(x, y) \\ k2(x, y) \end{bmatrix}$$

Formula 26 is obtained from Formula 25.

$$\begin{bmatrix} k0(x, y) \\ k1(x, y) \\ k2(x, y) \end{bmatrix} = \begin{bmatrix} R0 & R1 & R2 \\ G0 & G1 & G2 \\ B0 & B1 & B2 \end{bmatrix}^{-1} \begin{bmatrix} R(x, y) \\ G(x, y) \\ B(x, y) \end{bmatrix} \quad (26)$$

Therefore, when the vectors C0, C1, and C2 are obtained, k0 (x, y), k1 (x, y), and k2 (x, y) can be calculated from R (x, y), G (x, y), and B (x, y) using Formula 26.

Next, changing the light source color will be considered. Assuming that the light source color vector is changed from C1 to C1m at this time, the object body color vector is affected by it and changed from C0 to C0m as shown by Formula 27.

$$C0m = \begin{bmatrix} R0m \\ G0m \\ B0m \end{bmatrix} = \begin{bmatrix} \frac{R1m \cdot R0}{R1} \\ \frac{G1m \cdot G0}{G1} \\ \frac{B1m \cdot B0}{B1} \end{bmatrix} \quad (27)$$

where R0m, G0m, and B0m are scalars indicating the R component, G component, and B component of the object body color vector C0m after the light source color is changed respectively. Furthermore, R1m, G1m, and B1m are scalars indicating the R component, G component, and B component of the light source color vector C1m after the light source color is changed respectively.

The reason why the object body color vector C0m can be represented by Formula 27 is that the object body color is affected by the light source color as incident light. In Formula 19, Ip indicates the intensity of light wherein the relevant component of the light source color is not attenuated and Id when cos α is taken as 1 indicates the relevant component of the object body color.

Furthermore, when C0m and C1m are obtained, the variation color vector C2m can be obtained by calculating the exterior product thereof.

From the above mentioned, the color vector Cr (x, y) of the pixel P (x, y) after the light source color is changed is represented by Formula 28.

$$Cr(x, y) = \begin{bmatrix} Rr(x, y) \\ Gr(x, y) \\ Br(x, y) \end{bmatrix} \quad (28)$$

$$= \begin{bmatrix} R0m & R1m & R2m \\ G0m & G1m & G2m \\ B0m & B1m & B2m \end{bmatrix} \begin{bmatrix} k0(x, y) \\ k1(x, y) \\ k2(x, y) \end{bmatrix}$$

where Rr (x, y), Gr (x, y), and Br (x, y) are scalars indicating the R component, G component, and B component of the color vector Cr (x, y) of the pixel P (x, y) after the light source color is changed respectively. Furthermore, R2m, G2m, and B2m are scalars indicating the R component, G component, and B component of the variation color vector C2m after the light source color is changed respectively.

Furthermore, when reconstructing the color vector in Formula 28, the addition of the variation vector can be omitted and no particular practical problems are imposed.

Next, changing the object body color will be considered. Since the light source color can be handled regardless of changing or unchanging, it is expressed in C1 as a latest light source color.

When changing the object body color, a case that it is replaced with an object body color whereto the latest light source color C1 is reflected already and a case that the effect of the light source color is ignored will be considered first.

The common point of the above two cases is that the new object body color can be handled apparently independently of the light source color thereafter. Therefore, the vector C0m (x, y) which is generated as a new object body color or externally inputted can be replaced with C0. In this case, the object body color is set as a function of x and y so that it varies with the pixel position.

Furthermore, when C0m (x, y) and C1 are obtained, the variation color vector C2m (x, y) can be obtained by calculating the exterior product thereof.

In this case, the color vector Cr (x, y) of the pixel P (x, y) after the object body color is changed is represented by Formula 29.

$$Cr(x, y) = \begin{bmatrix} Rr(x, y) \\ Gr(x, y) \\ Br(x, y) \end{bmatrix} \quad (29)$$

$$= \begin{bmatrix} R0m(x, y) & R1 & R2m(x, y) \\ G0m(x, y) & G1 & G2m(x, y) \\ B0m(x, y) & B1 & B2m(x, y) \end{bmatrix} \begin{bmatrix} k0(x, y) \\ k1(x, y) \\ k2(x, y) \end{bmatrix}$$

where R0m (x, y), G0m (x, y), and B0m (x, y) are scalars indicating the R component, G component, and B component of the object body color vector C0m (x, y) after the object body color is changed respectively. Furthermore, R2m (x, y), G2m (x, y), and B2m (x, y) are scalars indicating the R component, G component, and B component of the variation color vector C2m (x, y) after the object body color is changed respectively.

Furthermore, when reconstructing the color vector in Formula 29, the addition of the variation vector can be omitted and no particular practical problems are imposed.

Furthermore, as mentioned above, the same operation can be performed even when the light source color is changed.

Next, when changing the object body color, a case that the object body surface has data in a form of a diffusion coefficient which is intrinsic to the object body surface whereto the light source color C1 is not reflected will be considered.

In this case, a procedure for changing the data expressed in the form of diffusion coefficient to an expression of object body color vector whereto the light source color C1 is reflected beforehand is necessary. When the data is handled as an object body color C0m (x, y) after the above procedure is performed, the subsequent procedure is the same as that in the aforementioned case that the object body color is replaced with an object body color whereto the latest light source color C1 is reflected already.

Next, a method for changing the data expressed in the form of diffusion coefficient to an expression of object body color vector will be described.

Since the light source color can be handled regardless of changing or unchanging, it is expressed in C1 as a latest light source color.

The object body color C0 is generally represented by Formula 30 and Formula 31 using the light source color vector C1 and the diffusion coefficient vector CRd which is instrinsic to the object body surface.

$$C0 = \begin{bmatrix} R0 \\ G0 \\ B0 \end{bmatrix} = \begin{bmatrix} R1 \cdot RRd \\ G1 \cdot GRd \\ B1 \cdot BRd \end{bmatrix} \quad (30)$$

$$CRd = \begin{bmatrix} RRd \\ GRd \\ BRd \end{bmatrix} \quad (31)$$

where RRd, GRd, and BRd are scalars indicating the R component, G component, and B component of the diffusion coefficient vector CRd which is intrinsic to the object body surface respectively.

Therefore, assuming that when the diffusion coefficient vector is represented by a function of CRd (x, y) which is a function of x and y, the object body color vector at the corresponding coordinates is Com (x, y), it is represented by Formula 32 and Formula 33.

$$C0m(x, y) = \begin{bmatrix} R0m(x, y) \\ G0m(x, y) \\ B0m(x, y) \end{bmatrix} = \begin{bmatrix} R1 \cdot RRd(x, y) \\ G1 \cdot GRd(x, y) \\ B1 \cdot BRd(x, y) \end{bmatrix} \quad (32)$$

$$CRd(x, y) = \begin{bmatrix} RRd(x, y) \\ GRd(x, y) \\ BRd(x, y) \end{bmatrix} \quad (33)$$

where RRd (x, y), GRd (x, y), and BRd (x, y) are scalars indicating the R component, G component, and B component of the diffusion coefficient vector CRd (x, y) which is intrinsic to the object body surface respectively.

When the above procedure is performed, the subsequent procedure is the same as that in the aforementioned case that the object body color is replaced with an object body color whereto the latest light source color C1 is reflected already.

By doing this, a simulation for changing the texture of the object body surface appearing in the area to a texture which is not monochromatic reflecting the shadow and shade and reflection can be performed.

Furthermore, according to the present invention, when a specific area on a color image is simulated reflecting the shadow and shade and reflection, by averaging the initial image beforehand, also an area including a texture which is not monochromatic can be simulated.

Next, the operation will be described in detail.

The object image is assumed as an color image and a RGB color model will be considered. Assuming the color vector of a pixel P (x, y) on the image as C (x, y), C (x, y) is generally expressed by Formula 20.

In the same way as with Formula 21, C (x, y) is represented by Formula 34.

$$C(x, y) = k0(x, y) C0(x, y) + k1(x, y) C1 + k2(x, y) C2(x, y) \quad (34)$$

where C0 (x, y), C1, and C2 (x, y) indicate an object body color vector, a light source color vector, and a variation color vector respectively and k0 (x, y), k1 (x, y), and k2 (x, y) indicate coefficients of the object body color vector, the light color vector, and the variation color vector respectively. The above variation vector means an exterior product of the object body color vector and the light source color vector.

C0 (x, y), C1, and C2 (x, y) are represented by Formula 35, Formula 23, and Formula 36 respectively.

$$C0(x, y) = \begin{bmatrix} R0(x, y) \\ G0(x, y) \\ B0(x, y) \end{bmatrix} \quad (35)$$

$$C2(x, y) = \begin{bmatrix} R2(x, y) \\ G2(x, y) \\ B2(x, y) \end{bmatrix} \quad (36)$$

where R0 (x, y), G0 (x, y), and B0 (x, y) are scalars indicating the R component, G component, and B component of the object body color vector C0 (x, y) respectively. Furthermore, R2 (x, y), G2 (x, y), and B2 (x, y) are scalars indicating the R component, G component, and B component of the variation color vector C2 (x, y) respectively.

The object body color vector mentioned above is not a constant vector and varies with x and y. Therefore, also the variation vector can be represented by a function of x and y. Next, when C0 (x, y) is averaged as shown by Formulas 3, 4, 5, and 6, by setting appropriate epsilon (x, y), the object body color is averaged in the object area and C0 (x, y) can be handled as a monochromatic vector having no texture. If this occurs, the averaged color vector Ca (x, y) is represented by Formula 37.

$$Ca(x, y) = k0(x, y) C0a + k1(x, y) C1 + k2(x, y) C2a \quad (37)$$

where C0a indicates an averaged object body color vector and C2a indicates an exterior product of C0a and C1. They are represented by Formula 38 and Formula 39.

$$C0a = \begin{bmatrix} R0a \\ G0a \\ B0a \end{bmatrix} \quad (38)$$

$$C2a = \begin{bmatrix} R2a \\ G2a \\ B2a \end{bmatrix} \quad (39)$$

The above mentioned is represented by Formula 40.

$$Ca(x, y) = \begin{bmatrix} Ra(x, y) \\ Ga(x, y) \\ Ba(x, y) \end{bmatrix}$$

$$= \begin{bmatrix} R0a & R1 & R2a \\ G0a & G1 & G2a \\ B0a & B1 & B2a \end{bmatrix} \begin{bmatrix} k0(x, y) \\ k1(x, y) \\ k2(x, y) \end{bmatrix} \quad (40)$$

Formula 41 is derived from Formula 40.

$$\begin{bmatrix} k0(x, y) \\ k1(x, y) \\ k2(x, y) \end{bmatrix} = \begin{bmatrix} R0a & R1 & R2a \\ G0a & G1 & G2a \\ B0a & B1 & B2a \end{bmatrix}^{-1} \begin{bmatrix} Ra(x, y) \\ Ga(x, y) \\ Ba(x, y) \end{bmatrix} \quad (41)$$

Therefore, when the vectors C0a, C1, and C2a are obtained, k0 (x, y), k1 (x, y), and k2 (x, y) can be calculated from Formula 41 using Ra (x, y), Ga (x, y), and Ba (x, y). When k0 (x, y), k1 (x, y), and k2 (x, y) of a pixel in the object area are obtained as mentioned above, the subsequent procedure for changing the light source color or the object body color is the same as the one previously mentioned. Also in this case, the texture of the object body surface shown in the area can be changed to a texture which is not monochromatic.

By doing this, also the area containing a texture which is not monochromatic can be simulated reflecting the shadow and shade and reflection.

An embodiment of the image simulation method and system of the present invention will be explained in detail with reference to FIGS. 1 to 5 wherein concrete examples of the implementation means thereof are shown.

FIG. 5(a) shows an image showing an example of a system bath. For example, it is assumed that an image (FIG. 5(c)) wherein the color of the wall of the system bath is changed to another color as shown in FIG. 5(b) is generated and outputted. The concrete processing procedure will be explained with reference to the flow chart shown in FIG. 1.

FIG. 2 is a block diagram of the hardware of this embodiment.

At Step 101, a color image (FIG. 5(a)) for simulation is inputted. In this case, it is assumed that the image data includes information which is called a mask value for each pixel in addition to color information. By allocating a special mask value only to the pixels in an area for image simulation, whether the pixel under operation is a pixel for simulation or not can be judged hereafter.

At Step 102, the standard color vector (Formula 2) in a simulation object area 501 of the image is set and is stored in the main memory of a computer 202 shown in FIG. 2. The color component of the standard color vector is directly inputted in a numerical value using a keyboard 203 externally.

At Step 103, the pixels of the object image are scanned first and the mean color vector (Formula 3) of the pixels in the object area is calculated around the pixels as shown in Formulas 4, 5, and 6 in the section of the operation mentioned above. In this case, the range $\epsilon$ (x, y) described in the section of the operation is assumed as a square area with a side of n pixels centered at a pixel under operation 301. A size n of the area 302 in which the mean operation is processed is directly inputted in a numerical value using the keyboard 203 externally. A value of a square of n is substituted for N (x, y) described in the section of the operation. Next, the ratio (Formula 7) of the mean color vector to the above standard color vector in each component is calculated for each pixel as shown in Formulas 8, 9, and 10 in the section of the operation mentioned above and stored in the main memory of the computer 202.

At Step 104, another image is generated by changing the color vectors in the object area 501 in the computer 202. The image can be generated by directly inputting color components in numerical values using the keyboard 203 externally and by filling the area with the color vectors. In this case, the initial image is called a 1st image and the image generated in the computer is called a 2nd image.

At Step 105, the pixels on the 1st image are scanned and by multiplying each component of the color vector of the pixel on the 2nd image which is at the same position as a pixel in the object area by the aforementioned ratio corresponding to this position as shown in Formulas 13, 14, and 15 in the section of the operation, a new color vector (Formula 12) is generated and a 3rd image is generated by replacing the color vector of the pixel on the 1st image with the new color vector. In this case, for the pixels outside the object area, the color vectors of the pixels on the 1st image are used unchanged. Next, this image is displayed on a CRT 201 and outputted to an external storage 205 as image data.

By the above procedure, even when the object area of the 1st image is not monochromatic and contains a fine texture, by ignoring the effect thereof, extracting only the information of shadow and shade, changing the area to another color, and then operating it, an image simulation reflecting the shadow and shade can be performed without being affected by the previous texture.

The aforementioned embodiment may be changed as shown below.

Firstly, the standard color vector set at Step 102 and the ratio calculated at Step 103 may be stored in the external storage 205 instead of the main memory of the computer 202 and the ratio used at Step 105 may be obtained by calling a ratio from the external storage 205. By changing the embodiment like this, various data can be stored in the external storage and a combination of information of shadow and shade which is different from the generated information of shadow and shade mentioned above can be simulated for the 1st image.

Secondly, the standard color vector at Step 102 may be set using one of the following five methods instead of directly inputting the color component of the standard color vector in a numerical value using the keyboard 203 externally. The first method is to display a color image on the CRT 201, to specify a pixel in the bright part free of shadow and shade in the object area of the image using a mouse 204, and to take the color vector thereof as a standard color vector. The second method is to display a color image on the CRT 201, to specify a pixel in the bright part free of shadow and shade in the object area of the image using the mouse 204, to set a square area with a side of n pixels near the pixel, to obtain the mean color vector of the pixels therein by the aforementioned procedure at Step 103, and to take the mean color vector as a standard color vector. In this case, the size of n is given externally. The third method is to display a color image on the CRT 201, to specify a pixel in the bright part free of shadow and shade in the object area of the image using the mouse 204, to set a square area with a side of n pixels near the pixel, to obtain the mean color vector of the pixels which are not only in the square area but also in the object area, and to take the mean color vector as a standard color vector. In this case, the size of n is given externally and N (x, y) necessary for averaging is the counted value of object pixels instead of a square of n. The fourth method is to display a color image on the CRT 201, to specify a pixel in the bright part free of shadow and shade in the object area of the image using the mouse 204, to set a square area with a side of n pixels near the pixel, to calculate the mean color vector of the pixels therein, to converge the mean value in each component by incrementing n two by two starting at 1 assuming n as a variable, and to take the color vector having the converged value as a component as a standard color vector. As to judgment of convergence, an appropriate threshold value is predetermined and when the variance becomes smaller than it, it is assumed that the mean value in each component is converged. The fifth method is to display a color image on the CRT 201, to specify a pixel in the bright part free of shadow and shade in the object area of the image using the mouse 204, to set a square area with a side of n pixels near the pixel, to calculate the mean color vector of the pixels which are not only in the square area but also in the object area, to converge the mean value in each component by incrementing n two by two starting at 1 assuming n as a variable, and to take the color vector having the converged value as a component as a standard color vector. As to judgment of convergence, an appropriate threshold value is predetermined and when the variance becomes smaller than it, it is assumed that the mean value in each component is converged. Furthermore, N (x, y) necessary for averaging is the counted value of object pixels instead of a square of n.

Thirdly, the mean color vector calculation method at Step 103 may be changed to one of the following five methods. The first method is to calculate the mean color vector of the pixels which are not only in the square area but also in the object area. In this case, N (x, y) necessary for averaging is the counted value of object pixels instead of a square of n. The second method is to use the size of one side of a square area, which is used for setting the standard color vector at Step 102, as a size n of the area in which the mean operation is processed. It is needless to say that this method can be executed only when Step 102 is changed to a method using a square area and the method is executed. The third method is to use the size of one side of a square area, which is used for setting the standard color vector at Step 102, as a size n of the area in which the mean operation is processed and to calculate the mean color vector of the pixels which are not only in the square area but also in the object area. It is needless to say that this method can be executed only when Step 102 is changed to a method using a square area and the method is executed. In this case, N (x, y) necessary for averaging is the counted value of object pixels instead of a square of n. The fourth method is to set a square area with a side of n pixels near the pixel under operation, to calculate the mean color vector of the pixels therein, to converge the mean value in each component by incrementing n two by two starting at 1 assuming n as a variable, and to take the color vector having the converged value as a component as a mean color vector. As to judgment of convergence, an appropriate threshold value is predetermined and when the variance becomes smaller than it, it is assumed that the mean value in each component is converged. The fifth method is to set a square area with a side of n pixels near the pixel under operation, to calculate the mean color vector of the pixels which are not only in the square area but also in the object area, to converge the mean value in each component by incrementing n two by two starting at 1 assuming n as a variable, and to take the color vector having the converged value as a component as a mean color vector. As to judgment of convergence, an appropriate threshold value is predetermined and when the variance becomes smaller than it, it is assumed that the mean value in each component is converged. In this case, N (x, y) necessary for averaging is the counted value of object pixels instead of a square of n.

Fourthly, the 2nd image generation method at Step 104 may be changed to one of the following methods. The first method is to set an arbitrary color vector for each pixel in the object area instead of filling the object area with the same color. In this embodiment, the color vector is generated interactively using the mouse 204 or the keyboard 203. The second method is to read a new 4th image (FIG. 4(a)) and to generate a second image (FIG. 4(b)) by texture-mapping the 4th image into an object area 401 of the 1st image. By doing this, an image simulation with a desired image attached in the object area of the 1st image can be performed. The third method is to read the 4th image by the second method mentioned above, to generate a 5th image by removing the global shadow and shade from the 4th image, and to generate a 2nd image by texture-mapping the 5th image into the object area of the 1st image. By doing this, the 3rd image, which shows the final result, is not affected by the unnecessary shadow and shade originally existing on the 4th image. The following procedure is used so as to remove the shadow and shade. Firstly, the method for setting the standard color vector at Step 102 or the modified method thereof mentioned above is executed for the 4th image. Next, the method for obtaining the ratio at Step 103 or the modified method thereof mentioned above is executed for the 4th image. Next, each component value of the color vector of each pixel of the 4th image is divided by the corresponding ratio. By doing this, an image wherein the shadow and shade of the 4th image are removed is generated. This image may be taken as a 5th image.

Fifthly, when the 2nd image is generated at Step 104, the pixels of the 1st image for changing may be a part of the object area of the 1st image instead of all the pixels thereof. Therefore, Step 104 may be changed and executed so that the color vectors are changed for the partial set of the object area of the 1st image. In this case, a method for filling the object area with a single color may be used as shown at Step 104 and all the modified examples mentioned above also can be executed.

Sixthly, it is possible to make Step 104 wherein the method for generating the 2nd image is explained offline as a procedure, to store the result in the external storage 205, and to read it from the external storage 205 when necessary. In this case, as a method for generating the 2nd image, not only the method at Step 104 mentioned above but also an arbitrary modified example mentioned above may be executed. By changing the embodiment like this, various data can be stored in the external storage and an image simulation using various combinations with the 2nd image can be performed for the 1st image.

Seventhly, although at Step 105, a 3rd image is generated, displayed on the CRT 201, and outputted to the external storage 205 as image data, the processing may end after the 3rd image is generated and displayed on the CRT. Furthermore, the processing may end after the image data is outputted unless the 3rd image is displayed on the CRT. Furthermore, the image data may be outputted to a hard copy unit or another arbitrary unit via the network instead of the external storage.

Eighthly, although the above embodiment is explained under the condition that the color model is an RGB color model, any arbitrary color model may be used.

Ninthly, although color images are used in the above embodiment, gray scale images may be used as described in the section of the operation.

Next, another embodiment will be explained in detail with reference to FIG. 6 and FIGS. 2 to 5 which are used to explain the aforementioned embodiment.

The flow chart shown in FIG. 6 is used to explain the concrete processing procedure.

The block diagram of the hardware shown in FIG. 2 may be used to explain this embodiment.

At Step 601, a color image (FIG. 5(a)) for simulation is inputted. In this case, it is assumed that the image data includes in format ion which is called a mask value for each pixel in addition to color information. By allocating a special mask value only to the pixels in an area for image simulation, whether the pixel under operation is a pixel for simulation or not can be judged hereafter.

At Step 602, the object body color vectors and the light source color vectors are extracted from the simulation object area 501 of the image in the same way as with Prior Art 2 or 3. Furthermore, the variation color vectors are generated from these color vectors as mentioned in the section of the operation. Next, these vectors are stored in the memory of the computer 202 shown in FIG. 2.

At Step 603, the pixels of the object image are scanned first and the coefficients when the color vectors of the pixels in the object area are represented by a linear sum of the above vectors are determined by the procedure described in the section of the operation. Next, the coefficients are stored in the memory of the computer 202.

At Step 604, another image is generated by changing the color vectors in the object area 501 in the computer 202. The image can be generated by specifying the pixels and color vectors thereof on the image interactively using the keyboard 203 or the mouse 204 externally. In this case, the initial image is called a 1st image and the image generated in the computer is called a 2nd image.

At Step 605, the pixels on the 1st image are scanned and by reconstructing the aforementioned linear sum by using the color vector of the pixel on the 2nd image, which is at the same position as a pixel in the object area, as a new object body color as shown in the section of the operation, a color vector corresponding to this position is generated and a 3rd image is generated by replacing the color vector of the pixel on the 1st image with the new color vector. In this case, for the pixels outside the object area, the color vectors of the pixels on the 1st image are used unchanged. Next, this image is displayed on the CRT 201 and outputted to the external storage 205 as image data.

By the above procedure, a simulation for changing the texture of the object body surface shown in the area to an arbitrary texture which is not monochromatic can be performed reflecting the shadow and shade and reflection. The aforementioned embodiment may be changed as shown below.

Figure 3:
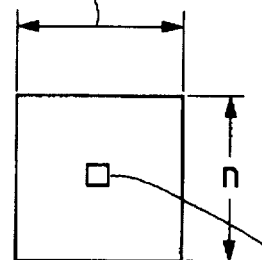
FIG. 3 is a diagram for explaining a method for averaging color vectors around the pixel under operation.
Figure 4A:
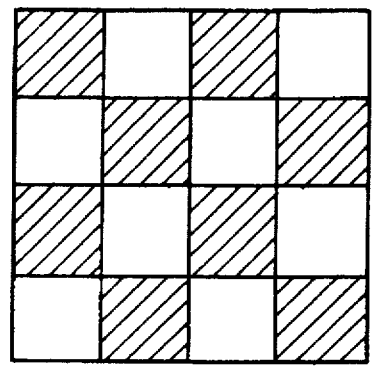
FIG. 4(a) shows a new image and FIG. 4(b) shows a generated image by texture mapping the new image.
Figure 4B:
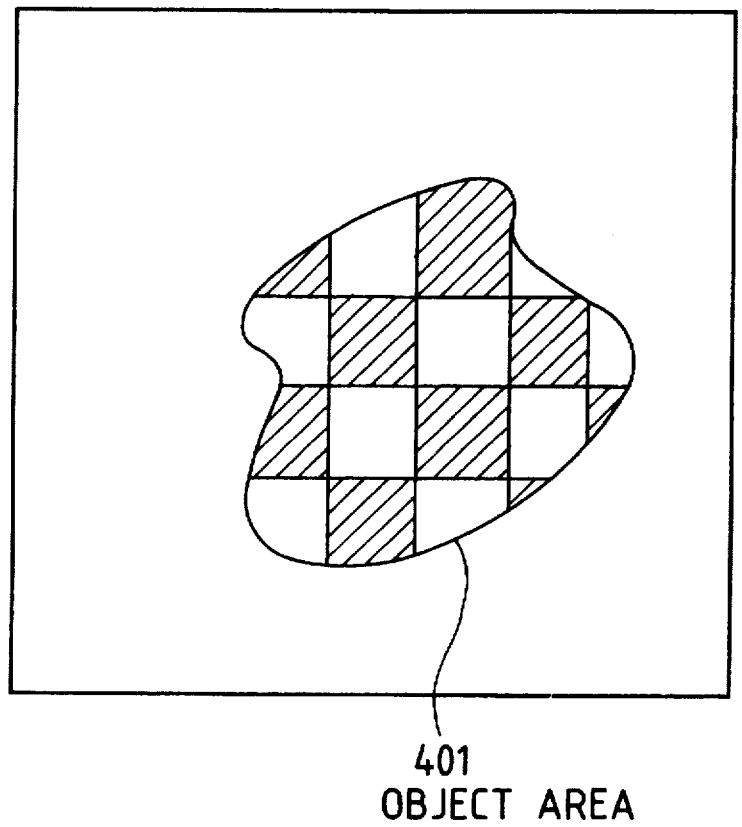

Firstly, before the object body color vectors and the light source color vectors are extracted at Step 602, processing for performing a mean operation for the object image may be added. By doing this, an image simulation can be performed even in an area on an image which is not monochromatic and contains a texture as shown in the section of the operation. The mean operation may be performed by one of the methods indicated below. The first method is to set a square area with a side of n pixels in the object area as shown in FIG. 3 and to calculate the mean color vector of the pixels contained in this area. In this case, the size of n is given externally. The second method is to set a square area with a side of n pixels in the object area in the same way and to calculate the mean color vector of the pixels which are not only in the square area but also in the object area. In this case, the size of n is given externally and the number of pixels which is necessary for averaging and concerned in averaging is the counted value of concerned pixels instead of a square of n.

Secondly, the method for generating the 2nd image at Step 604 may be changed to one of the following three methods. The first method is to fill the object area, which is required to be not monochromatic and to contain a texture, with the color vector which is externally specified by the keyboard 203 in the same color. The second method is to read a new 4th image (FIG. 4(*a*)) and to generate a second image (FIG. 4(*b*)) by texture-mapping the 4th image into an object area 401 of the 1st image. By doing this, an image simulation with a desired image attached in the object area of the 1st image can be performed. The third method is to read the 4th image by the second method mentioned above, to generate a 5th image by removing the global shadow and shade from the 4th image, and to generate a 2nd image by texture-mapping the 5th image into the object area of the 1st image.

By doing this, the 3rd image, which shows the final result, is not affected by the unnecessary shadow and shade originally existing on the 4th image. The following procedure is used so as to remove the shadow and shade. Firstly, the method for setting the standard color vector at Step 102 or the modified method thereof mentioned above is executed for the 4th image. Next, the method for obtaining the ratio at Step 103 or the modified method thereof mentioned above is executed for the 4th image. Next, each component value of the color vector of each pixel of the 4th image is divided by the corresponding ratio. By doing this, an image wherein the shadow and shade of the 4th image are removed is generated. This image may be taken as a 5th image.

Thirdly, a procedure for changing the light source color may be added between Steps 603 and 604. In this embodiment, the light source color vector is specified interactively using the keyboard 203 or the mouse 204 externally. By doing this, an image simulation can be performed by changing the light source color as described in the section of the operation.

Fourthly, at the stage that the 2nd image is generated at Step 604, the latest light source color may be reflected to the 2nd image as described in the section of the operation. When the light source color is not changed, it is the light source color which is extracted at Step 602. When the procedure for changing the light source color is added between Steps 603 and 604 as mentioned above and the light source color is changed, it is the light source color after changing. Each component of the color vector whereto the light source color is reflected is obtained by multiplying each component of the color vector given at first by each component of the light source color as described in the section of the operation. By doing this, the object body color can be set so that it is affected by the light source color. Therefore, a more realistic image simulation can be performed.

Fifthly, when the 2nd image is generated at Step 604, the pixels of the 1st image for changing may be a part of the object area of the 1st image instead of all the pixels thereof. Therefore, Step 104 may be changed and executed so that the color vectors are changed for the partial set of the object area of the 1st image. In this case, the method shown at Step 604 may be used and all the modified examples mentioned above also can be executed.

Sixthly, at the stage that the light source vectors and the object body color vectors are extracted and stored at Step 602, it is possible to store those vectors in the external storage 205 instead of the main memory of the computer and to call and obtain them from the external storage when they are necessary for the subsequent processing. By changing the embodiment like this, various data can be stored in the external storage and an image simulation can be executed by fetching an arbitrary set of vectors from various data.

Seventhly, it is possible to make Step 604 wherein the method for generating the 2nd image is explained offline as a procedure, to store the result in the external storage 205, and to read it from the external storage 205 when necessary. In this case, as a method for generating the 2nd image, not only the method at Step 604 mentioned above but also an arbitrary modified example mentioned above may be executed. By changing the embodiment like this, various data can be stored in the external storage and an image simulation using various combinations with the 2nd image can be performed for the 1st image.

Eighthly, although at Step 605, a 3rd image is generated, displayed on the CRT 201, and outputted to the external storage 205 as image data, the processing may end after the 3rd image is generated and displayed on the CRT. Furthermore, the processing may end after the image data is outputted unless the 3rd image is displayed on the CRT. Furthermore, the image data may be outputted to a hard copy unit or another arbitrary unit via the network instead of the external storage.

Ninthly, although the above embodiment is explained under the condition that the color model is an RGB color model, any arbitrary color model may be used.

This first embodiment obtains good results indicated below.

(1) When an image simulation for changing the color or texture in an area on a color or monochromatic gray scale image reflecting the shadow and shade of the initial image is performed, an image simulation for reflecting the shadow and shade by ignoring the effect of the fine texture of the initial image can be performed.

(2) When an image simulation for changing the color or texture in an area on a color or monochromatic gray scale image reflecting the shadow and shade of the initial image is performed, an image simulation for reproducing the shadow and shade precisely without being affected by the object body color can be performed.

(3) When an image simulation for changing the color or texture in an area on a color image reflecting the shadow and shade of the initial image is performed, an image simulation for reproducing the difference in the light source color precisely can be performed.

(4) An image simulation for changing the texture of a specific area on a color image to a texture which is not monochromatic reflecting the shadow and shade and reflection of the initial image can be performed.

(5) An image simulation for changing a specific area on a color image which contains a texture which is not monochromatic reflecting the shadow and shade and reflection of the initial image can be performed.

[Second embodiment]

Next, the basic concepts of the texture mapping and system of the second embodiment will be explained first.

A case that there are grid points on a plane in a three-dimensional space, and there is a projection whereon the grid points are perspectively projected, and the position information of the grid points on the projection is required to obtain will be considered.

There are n grid points and the positions thereof on the plane and projection are represented by $(x_i, y_i)$ and $(x'_i, y'_i)$ (where $i=1, 2, 3, \ldots, n$) respectively.

In this case, it is assumed that $(x_i, y_i)$ ($i=1, 2, 3, \ldots, n$) are known already.

Furthermore, it is assumed that four points on the projection $(x'_i, y'_i)$ are known already.

In this case, it is assumed that the known points are points when "i" is set to 1, 2, 3, and 4. This setting is just a general example.

Furthermore, in this case, that the grid structure is known already is that $(x_i, y_i)$ ($i=1, 2, 3, \ldots, n$) are known already.

Since $(x_i, y_i)$ ($i=1, 2, 3, \ldots, n$) are on the same plane and $(x'_i, y'_i)$ ($i=1, 2, 3, \ldots, n$) are on the projection plane, a constant matrix A (Formula 202) wherein Formula 201 is held for all "i"s exists. In this case, a homogeneous coordinate system is used.

$$[x'_i \; y'_i \; 1] = [x_i \; y_i \; 1] \cdot A \tag{201}$$

$$A = \begin{bmatrix} a11 & a21 & c \\ a12 & a22 & d \\ b1 & b2 & 1 \end{bmatrix} \tag{202}$$

Formula 203 is derived from Formulas 201 and 202.

$$[x'_i \; y'_i \; 1] = \tag{203}$$
$$[a11 \cdot x_i + a12 \cdot y_i + b1 \;\; a21 \cdot x_i + a22 \cdot y_i + b2 \;\; c \cdot x_i + d \cdot y_i + 1]$$

Formula 204 is obtained by representing Formula 203 by ordinary coordinates.

$$[x'_i \; y'_i] = \left[ \frac{a11 \cdot x_i + a12 \cdot y_i + b1}{c \cdot x_i + d \cdot y_i + 1} \quad \frac{a21 \cdot x_i + a22 \cdot y_i + b2}{c \cdot x_i + d \cdot y_i + 1} \right] \tag{204}$$

Formulas 205 and 206 are derived from Formula 204.

$$x_i \cdot a11 \cdot y_i \cdot a12 + b1 - x_i \cdot x'_i \cdot c - y_i \cdot x'_i \cdot d = x'_i \tag{205}$$

$$x_i \cdot a21 \cdot y_i \cdot a22 + b2 - x_i \cdot y'_i \cdot c - y_i \cdot y'_i \cdot d = y'_i \tag{206}$$

In this case, Formula 207 and Formula 208 are obtained by setting "i" to 1, 2, 3, and 4.

$$[x'_1 \; x'_2 \; x'_3 \; x'_4 \; y'_1 \; y'_2 \; y'_3 \; y'_4] = [a11 \; a12 \; b1 \; a21 \; a22 \; b2 \; c \; d] \cdot T1 \tag{207}$$

$$T1 = \begin{bmatrix} x1 & x2 & x3 & x4 & 0 & 0 & 0 & 0 \\ y1 & y2 & y3 & y4 & 0 & 0 & 0 & 0 \\ 1 & 1 & 1 & 1 & 0 & 0 & 0 & 0 \\ 0 & 0 & 0 & 0 & x1 & x2 & x3 & x4 \\ 0 & 0 & 0 & 0 & y1 & y2 & y3 & y4 \\ 0 & 0 & 0 & 0 & 1 & 1 & 1 & 1 \\ -x1 \cdot x'1 & -x2 \cdot x'2 & -x3 \cdot x'3 & -x4 \cdot x'4 & -x1 \cdot y'1 & -x2 \cdot y'2 & -x3 \cdot y'3 & -x4 \cdot y'4 \\ -y1 \cdot x'1 & -y2 \cdot x'2 & -y3 \cdot x'3 & -y4 \cdot x'4 & -y1 \cdot y'1 & -y2 \cdot y'2 & -y3 \cdot y'3 & -y4 \cdot y'4 \end{bmatrix} \tag{208}$$

When the matrix T1 is a non-singular matrix, an inverse matrix T2 (Formula 209) is obtained.

$$T2 = T1^{-1} \tag{209}$$

For $i=1, 2, 3,$ and 4, each element of a matrix A is determined from Formula 2010 because $(x_i, y_i)$ and $(x'_i, y'_i)$ are known already.

$$[a11 \; a12 \; b1 \; a21 \; a22 \; b2 \; c \; d] = [x'_1 \; x'_2 \; x'_3 \; x'_4 \; y'_1 \; y'_2 \; y'_3 \; y'_4] \cdot T2 \tag{2010}$$

From Formulas 201 and 202, the position information of all the grid points on the projection can be obtained.

By the aforementioned method, since the position information of every grid point on the plane which is projected on the projection can be calculated from the position information of a smaller number of grid points, the operator's job is reduced. Furthermore, position information which matches the composition of the perspective projection can be obtained.

Furthermore, the operation of a method for calculating the coordinate values of four points on the projection corresponding to each area which are necessary for setting the parameters for projection transformation in each area from the coordinate values on the plane of the above four points and the coordinate values on the plane and the projection of a set of four points which are unrelated to any area will be described hereunder.

In the same way as with the description of the operation of the aforementioned grid point calculation method, it is assumed that (xi, yi) (i=1, 2, 3, ..., n) are points on the plane and (x'i, y'i) (i=1, 2, 3, ..., n) are points on the projection. It is assumed that four points which have known coordinate values and are not related to any area are points when "i" is set to 1, 2, 3, and 4 and unknown points (x'i, y'i) are points when "i" is set to at least 5.

Also in this case, the matrix A (Formula 202) which allows Formula 201 to be held exists. When "i" is set to 1, 2, 3, and 4 in Formulas 205 and 206, Formulas 207 and 208 are obtained. When the inverse matrix T2 of the matrix T1 is obtained, each element of the matrix A is determined from Formula 2010.

When (xi, yi) (i=1, 2, 3, ..., n) are given in Formulas 201 and 202, the corresponding (x'i, y'i) (i=1, 2, 3, ..., n) can be calculated.

By the aforementioned procedure, when four points on the plane correspond to four points on the projection, and the mapping destination is a plurality of areas on the same plane, and the coordinate value of a certain point is necessary for setting the parameters for projection transformation in each area, and the point is allocated as a point with "i" of at least 5, the coordinate value on the projection can be easily obtained.

Furthermore, the operation of a method for calculating the coordinate value necessary for setting the parameters for projection transformation and then disturbing the coordinate value by disturbance so as to use the resultant coordinate value for setting the parameters for projection transformation will be described hereunder.

An effect of disturbance is produced on the coordinate value (x'i, y'i) of the point on the projection which is calculated as mentioned above.

A function whereto a random number is returned is assumed as R ( ). Values which are obtained by operating R ( ) to x'i and y'i are assumed as x"i and y"i and used for setting the parameters for projection transformation.

By the above procedure, the trend to dependence on the coordinate value calculation method can be relaxed.

Furthermore, the operation of a method for calculating the coordinate value necessary for setting the parameters for projection transformation and then searching the true position near the coordinate value so as to use the resultant coordinate value for setting the parameters for projection transformation will be described hereunder.

The true position is searched near the point (x'i, y'i) on the projection which is calculated as mentioned above. When the true position is a feature point on the projection which can be extracted by image processing, a space filter, which is suitable for extracting it, is produced and operated by changing the position thereof near the point, and the coordinate value of the position with a high correlative value obtained by the template matching operation is taken as a true value.

By the above procedure, more precise texture mapping can be realized.

Furthermore, the operation of a method for holding data wherein information on whether or not to perform texture mapping for each pixel in at least one of the first and second images is described and judging whether or not to perform texture mapping for each pixel by referring to it will be described hereunder.

Each image has a pixel value indicating the color or intensity of each pixel.

In addition to this data, it is assumed that each image has data describing in each pixel whether or not to take the pixel as a pixel of a texture image and to map it into another image or whether or not to map the pixel from another image and to rewrite the pixel value. Whether or not to perform texture mapping is judged by referring to this data.

In the above description, this data is held by each pixel. However, the data may be held in a compressed form such as run length data or may be expanded so that it is described as a function depending on the pixel position and the function is held as data. Furthermore, the above function may be described as a function of a pixel value.

By the above procedure, by holding data wherein information on whether or not to perform texture mapping for each pixel in at least one of the first and second images is described and by judging whether or not to perform texture mapping for each pixel by referring to it, whether or not to perform texture mapping can be controlled for each pixel in one of the first and second images and whether or not to perform texture mapping can be controlled for each pixel also in both the first and second images.

A concrete realization means for the grid point calculation method which is the second embodiment of the present invention will be explained in detail with reference to FIGS. 7 to 9.

Figure 7B:
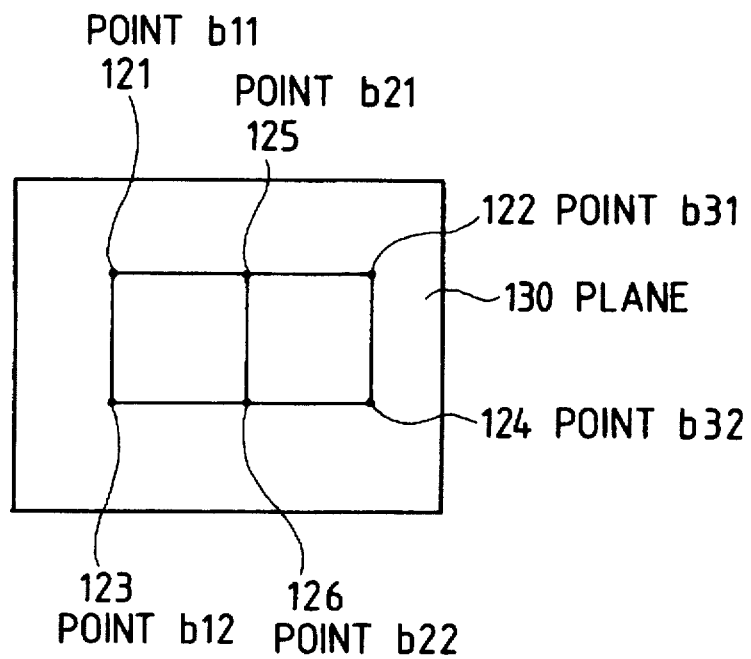

Grid points (point b11 121, point b21 125, point b31 122, point b12 123, point b22 126, point b32 124) on a plane 130 as shown in FIG. 7(b) are set in a three-dimensional space and perspectively projected as grid points (point a11 111, point a21 115, point a31 112, point a12 113, point a22 116, point a32 114) as shown in FIG. 7(a). In the projection, point bij corresponds to point aij (wherein i=1, 2, and 3 and j=1 and 2).

In this case, it is assumed that all the coordinate values of the points bij (wherein i=1, 2, and 3 and j =1 and 2) and the coordinate values of the points a11, a31, a12, and a32 are obtained.

Assuming the coordinate values of the above points as follows:

point a11 (x'1, y'1), point a21 (x'5, y'5), point a31 (x'2, y'2), point a12 (x'3, y'3), point a22 (x'6, y'6), point a32 (x'4, y'4), point b11 (x1, y1), point b21 (x5, y5), point b31 (x2, y2), point b12 (x3, y3), point b22 (x6, y6), and point b32 (x4, y4), the coordinate values of the points a21 and a22 can be calculated by the procedure described in the section of the operation.

Next, the processing procedure of the aforementioned embodiment will be explained with reference to the flow chart shown in FIG. 16.

At Step 1601, the coordinate values of n grid points on the plane and the coordinate values of 4 points among the n points on the corresponding projection are inputted. At Step 1602, formulas of the corresponding four points which are shown in Formula 204 are derived. Since there are x and y coordinates provided, 8 formulas in total can be derived.

At Step 1603, these formulas are expressed in eight-dimensional vectors and 8 by 8 matrices as shown in Formula 207.

At Step 1604, inverse matrices of the 8 by 8 matrices are calculated.

At Step 1605, the parameters for projection transformation from the plane to the projection are calculated as shown in Formula 2010.

At Step 1606, the coordinate value on the projection corresponding to an arbitrary point on the plane is calculated from the above parameters using Formulas 202 and 201.

In the above embodiment, a grid structure having 6 points is used as shown in FIG. 7. However, the grid structure of this embodiment is not limited to the one shown in FIG. 7 and any grid structure may be used. For example, also for a grid structure which is separated into parts on the same plane as shown in FIG. 8, the above procedure may be used, so that the grid structure may be expanded like this. Furthermore, in the above embodiment, four known points aij are used as shown in FIG. 7. However, other four points may be selected, though it is necessary that the inverse matrix T2 described in the section of the operation exists.

Furthermore, in the above embodiment, any coordinate space for determining the coordinate value of each point bij on the plane may be used when it is a linear space. For example, even when a coordinate axis is taken as a coordinate axis (1) 301 or a coordinate axis (2) 302 as shown in FIG. 9, the coordinate value on the projection which is calculated using the above coordinate axis is not affected. Therefore, for example, in FIG. 7(b), instead of the information of the coordinate values of all the points bij, a description that two congruent squares are lined up right and left with one side common, and the upper left point of the square on the left is a point b11, and the lower left point is a point b12, and the upper right point of the square on the right is a point b31, and the lower right point is a point b32 may be used. Therefore, a description that a figure in a certain coordinate system is similar to a figure in another coordinate system and the points in the former coordinate system correspond to the points in the latter coordinate system is satisfactory. By doing this, the coordinate values of all the grid points on the projection which match the composition of the perspective projection can be calculated.

An embodiment of the texture mapping method of the embodiment of the present invention will be explained in detail with reference to FIGS. 10 and 11.

Figure 10B:
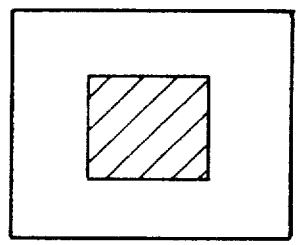
Figure 10C:
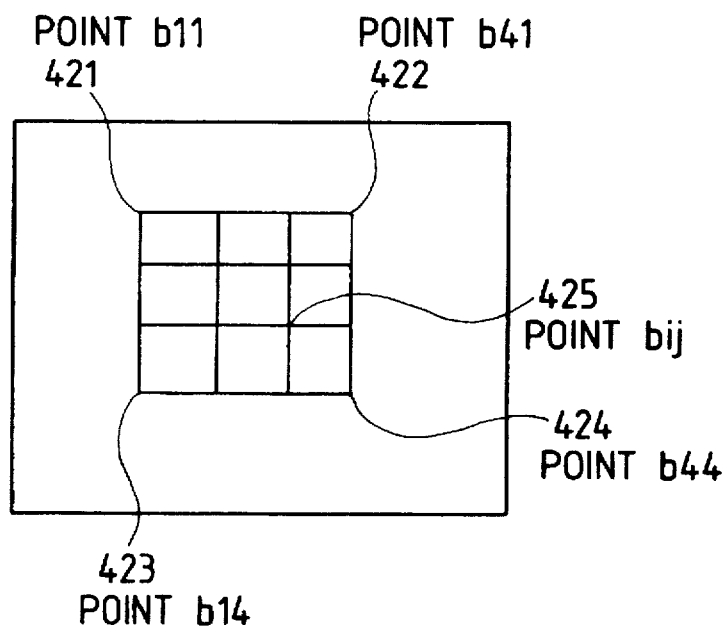

Grid points (point bij 425 including point b11 421, point b41 422, point b14 423, and point b44 424) on the plane as shown in FIG. 10(c) are set in a three-dimensional space and perspectively projected as grid points as shown in FIG. 10(a). Points on the projection which correspond to the points bij 425 on the plane are taken as points aij 415 (wherein i=1, 2, 3, and 4 and j=1, 2, 3, and 4).

Assuming the area enclosed by each grid as a mapping area 416, mapping of the texture image shown in FIG. 10(b) is considered.

In this case, it is assumed that all the coordinate values of the points bij (wherein i=1, 2, 3, and 4 and j=1, 2, 3, and 4) and the coordinate values of the points a11 411, a41 412, a14 413, and a44 414 are obtained.

Assuming the coordinate values of the above points as follows:

point a11 (x'1, y'1), point a41 (x'2, y'2), point a14 (x'3, y'3), point a44 (x'4, y'4), point b11 (x1, y1), point b41 (x2, y2), point b14 (x3, y3), and point b44 (x4, y4), the coordinate values of aij can be calculated from the coordinate value of bij by the procedure described in the section of the operation.

In the above embodiment, a grid structure having 16 grid points is used as shown in FIG. 10. However, the grid structure of this embodiment is not limited to the one shown in FIG. 10 and a set of any mapping areas may be used. For example, also for mapping areas which are separated on the same plane as shown in FIG. 11, the above procedure may be used, so that the grid structure may be expanded like this.

Furthermore, in the above embodiment, four known points aij at the end are used as shown in FIG. 10. However, other four points may be selected, though it is necessary that the inverse matrix T2 described in the section of the operation exists.

Furthermore, in the above embodiment, any coordinate space for determining the coordinate value of each point bij on the plane may be used when it is a linear space. Therefore, for example, in FIG. 10(c), instead of the information of the coordinate values of all the points bij, a description that four square grids are lined up in the longitudinal direction and four square grids are lined up in the transverse direction (16 square grids in total), and the point b11 corresponding to the point a11 is the upper left point, and the point b14 corresponding to the point a14 is the lower left point, and the point b41 corresponding to the point a41 is the upper right point, and the point b44 corresponding to the point a44 is the lower right point may be used. Therefore, a description that a figure in a certain coordinate system is similar to a figure in another coordinate system and the points in the former coordinate system correspond to the points in the latter coordinate system is satisfactory.

The coordinate values of four points which are necessary for setting the parameters for projection transformation can be obtained from the coordinate values of the points aij obtained as mentioned above in each mapping area, so that the parameters for projection transformation can be set.

Texture mapping can be realized so that it matches the composition of the perspective projection by using the parameters for projection transformation.

Furthermore, in this embodiment, each calculated coordinate value may be processed as mentioned below so as to use the resultant value unless the above calculated coordinate value is used for setting the parameters for projection transformation.

One processing is to give a random number to the value so as to disturb it.

It is assumed that the upper limit of disturbance for the coordinate value is Rmax and a function which generates a random number ranging from −1 to 1 whenever it is called is R ( ). Assuming the calculated coordinate value mentioned above as (X'i y'i), (x'i+Rmax·R ( ), y'i+Rmax·R ( )) is used for setting the parameters for projection transformation.

Furthermore, the other processing is to search the true position around the calculated coordinate value and to obtain an accurate value.

To detect intersecting segments, a product sum of the matrix component and corresponding pixel value is calculated around the calculated coordinate value using the matrix shown in FIG. 12, and a highly correlated point is detected so as to obtain the true position, and the coordinate value of this position is used for setting the parameters for projection transformation.

The matrix used in the above embodiment is an example of the matrix for detecting intersecting segments. However, any other matrix which can produce the same effect may be used. Another embodiment of the texture mapping method of the present invention will be explained in detail hereunder with reference to FIGS. 13 to 15.

Figure 13A:
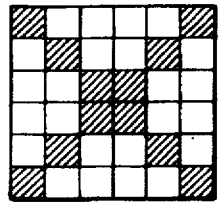
Figure 13B:
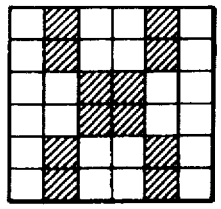
Figure 14A:
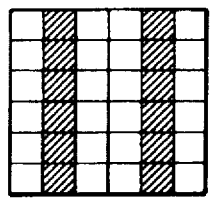
Figure 14B:
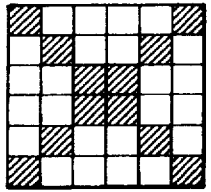
Figure 14C:
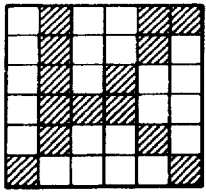
Figure 14D:
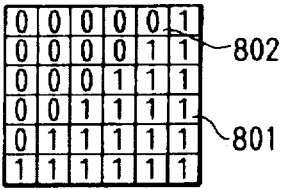
Figure 15A:
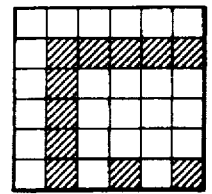
Figure 15B:
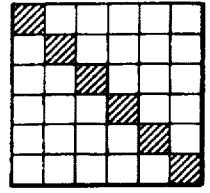
Figure 15C:
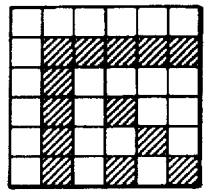
Figure 15D:
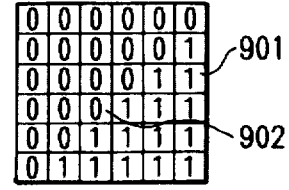
Figure 15E:
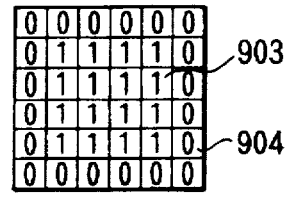

When an image 2 is texture-mapped in an image 1, an embodiment of the texture mapping method for controlling whether or not to map the image 2 for each pixel of the image 2 will be explained with reference to FIG. 13. Texture mapping of the image 2 (FIG. 13(b)) in the image 1 (FIG.

13(*a*)) in same size will be considered. As to the image 2, data (FIG. 13(*d*)) of 1 denoting pixels 701 indicating parts which can be mapped and of 0 denoting pixels 702 indicating parts which cannot be mapped is prepared beforehand besides pixel value data (FIG. 13(*b*)). When only the pixels wherein the data is 1 are texture-mapped in the image 1 (FIG. 13(*a*)) in the case of texture mapping, the mapping result by controlling whether or not to map for each pixel of the image 2 is obtained as shown in FIG. 13(*c*). In this case, how to write data of 0 or 1 is not limited to the above mentioned. Furthermore, the texture mapping method is not limited, so that composition of same size or composition by projection transformation may be used.

When the image 2 is texture-mapped in the image 1, an embodiment of the texture mapping method for controlling whether or not to map the image 2 for each pixel of the image 1 will be explained with reference to FIG. 14. Texture mapping of the image 2 (FIG. 14(*b*)) in the image 1 (FIG. 14(*a*)) in same size will be considered. As to the image 1, data (FIG. 14(*d*)) of 1 denoting pixels 801 indicating parts to which mapping is allowed and of 0 denoting pixels 802 indicating parts which cannot be mapped is prepared beforehand besides pixel value data (FIG. 14(*a*)). When only the pixels from image 2 in the case of texture mapping are texture-mapped to the pixels wherein the data is 1 in the image 1, the mapping result by controlling whether or not to be mapped for each pixel of the image 1 is obtained as shown in FIG. 14(*c*). In this case, how to write data of 0 or 1 is not limited to the above mentioned. Furthermore, the texture mapping method is not limited, so that composition of same size or composition by projection transformation may be used.

When the image 2 is texture-mapped in the image 1, an embodiment of the texture mapping method for controlling whether or not to map the image 2 for each pixel of both the images 1 and 2 will be explained with reference to FIG. 15. Texture mapping of the image 2 (FIG. 15(*b*)) in the image 1 (FIG. 15(*a*)) in same size will be considered. As to the image 1, data (FIG. 15(*d*)) of 1 denoting pixels 901 indicating parts to which mapping is allowed and of 0 denoting pixels 902 indicating parts which cannot be mapped is prepared beforehand besides pixel value data (FIG. 15(*a*)). As to the image 2, data (FIG. 15(*e*)) of 1 denoting pixels 903 indicating parts which can be mapped and of 0 denoting pixels 904 indicating parts which cannot be mapped is prepared beforehand besides pixel value data (FIG. 15(*b*)). When the pixel in the image 2 is texture-mapped to the pixel in the image 1 only when the corresponding data are 1 in the case of texture mapping, the mapping result by controlling whether or not to map for each pixel of both the images 1 and 2 is obtained as shown in FIG. 15(*c*). In this case, how to write data of 0 or 1 is not limited to the above mentioned. Furthermore, the texture mapping method is not limited, so that composition of same size or composition by projection transformation may be used.

In the above description, this data is held by each pixel. However, the data may be held in a compressed form such as run length data. By doing this, equivalent information may be held with a smaller capacity.

Furthermore, the data may be expanded so that it is described as a function depending on the pixel position and the function is held as data. For example, it is assumed that the coordinate value of an image in the transverse direction is i, and the coordinate value thereof in the longitudinal direction is j, and the upper left of the image is the origin, and the right direction of i and the downward direction of j are positive. In this case, for example, for a pixel of (i, j) under the condition that j<i+100, whether or not to perform texture mapping can be judged under the condition that the texture mapping is performed. This means that there is no need to hold data for each pixel, though data of information for determining whether or not to perform texture mapping in correspondence with each pixel is necessary. This can be executed as a modified one of the above embodiment. By doing this, information may be held with a smaller capacity.

When pixel values r, g, and b range from 0 to 255, for a pixel under the condition that r<50, and g<50, and b>200, whether or not to perform texture mapping can be judged under the condition that the texture mapping is performed. This means that there is no need to hold data for each pixel, though data of information for determining whether or not to perform texture mapping in correspondence with each pixel is necessary. This can be executed as a modified one of the above embodiment. By doing this, whether or not to perform texture mapping can be determined in accordance with the area wherein pixels exist in a color space.

In the embodiment of the texture mapping method that when a texture image is projection-transformed and composed using a plurality of areas on a projection which is obtained by perspectively projecting the aforementioned three-dimensional space as mapping areas, the operator'job can be reduced by calculating a coordinate value on the projection and texture mapping which matches the composition of the perspective projection can be performed, texture mapping that the data wherein the aforementioned information of whether or not to perform texture mapping is described is held by each pixel of at least one of the projection and texture image and whether or not to perform texture mapping is judged for each pixel by referring to the data can be executed.

Furthermore, for execution of the above texture mapping, processing that a disturbance is applied to the calculated coordinate value above mentioned may be added or processing that the true value is searched around the calculated coordinate value above mentioned may be added. The present invention obtains good results indicated below.

(1) According to the grid point calculation method of the present invention, by extracting, when obtaining the position information of grid points on the perspective projection which are originally on a plane in a three-dimensional space, the position information of a smaller number of grid points by a mouse or another means instead of extracting the position information of all the object grid points by the mouse or another means and by calculating the position information of the residual points so that it matches the composition of the perspective projection, the operator's job is reduced. Furthermore, position information which matches the composition of the perspective projection can be obtained.

(2) According to the texture mapping method of the present invention, by extracting, when in the texture mapping for composing a texture image by projection transformation for a projection of a perspectively projected three-dimensional space, the same texture image is mapped one after another in a plurality of areas on the projection on the same plane in the three-dimensional space before projection and the coordinate values of the four points corresponding to the areas on the projection which are necessary for setting parameters for projection transformation in each area are obtained, the coordinate values of a smaller number of points are extracted by the mouse or another means instead of extracting the coordinate values of each four points on the projection in all the areas by the mouse or another means and by calculating the coordinate values of the residual points so that they match the composition of the perspective projection, the operator's job is reduced. Furthermore, coordinate values which match the composition of the perspective projection can be obtained.

Furthermore, by calculating the coordinate value necessary for setting the parameters for projection transformation and by disturbing the coordinate value by disturbance so as to use the resultant coordinate value for setting the parameters for projection transformation, the trend to dependence on the coordinate value calculation method can be relaxed and a composition wherein texture images are lined up excessively artificially in good order can be changed to a natural composition.

Furthermore, although the above calculated coordinate values may not indicate the true position on the projection for the reason of errors by direct extraction by the mouse or another means, image distortion, or grid points which are not located precisely on the same plane, by searching the true position around the above calculated coordinate values and by using the resultant coordinate values for setting the parameters for projection transformation, more precise mapping can be realized.

(3) Furthermore, according to the texture mapping method of the present invention, in texture mapping for composing the 1st image with the 2nd image, by holding data wherein information on whether or not to perform texture mapping for each pixel in at least one of the first and second images is described and by judging whether or not to perform texture mapping for each pixel by referring to it, whether or not to perform texture mapping can be easily controlled for each pixel in one of the first and second images. Furthermore, whether or not to perform texture mapping can be easily controlled for each pixel in both the first and second images.

What is claimed is:

1. A method of simulating an image in a system having an image input means, an image output means, a processor, and a means for performing image simulation of an object area for reconstruction into the simulated image, the method comprising the steps of:

inputting a first image with said image input means;

determining a standard color vector for each pixel of the object area of said first image;

calculating a mean color vector for each of plurality of pixels neighboring said object area of said first image;

calculating a ratio of each mean color vector to a corresponding one of the standard color vectors for each pixel;

generating a second image from said object area by changing the color vectors of at least one part of the pixels in said object area;

adjusting the color vector of each pixel of said second image corresponding to each pixel in said object area with said ratio corresponding to said each pixel;

generating a third image with the color vectors of each pixel as adjusted in the color vector adjusting step; and outputting said third image with said image output means.

2. A method of simulating an image according to claim 1, wherein said step of calculating the mean color vectors includes:

a step of setting a square area with a side of n pixels, said square area having a center located at said each pixel, a step of repeatedly calculating the mean color vector in the square area by incrementing the n two by two until a difference between said mean color vector an a previous mean color vector becomes less then a predetermined threshold value, and a step of using a final mean color vector as said mean color vector.

3. A method of simulating an image according to claim 1, further including prior to the step of determining the standard color vectors texture-mapping a fourth image which is different from said first to third images into said object area of the first image.

4. A method of simulating an image according to claim 1, further including prior to the step of determining the standard color vectors texture-mapping a fourth image into said object area, said fourth image being an image from which a global shadow and shade are removed beforehand.

5. A method of simulating an image according to claim 4, wherein said step of generating a second image comprises the steps of:

setting a square area with a side of n pixels surrounding each pixel of the first image with said texture-mapped fourth image;

repeating the process of calculating the mean color vector in the square area by incrementing the n two by two starting at 1 until a difference between said mean color vector and a previous mean color vector becomes less than a predetermined threshold value;

taking a final vector as a mean color vector;

calculating the ratio of said final color vector to the standard color vector corresponding to each pixel; and dividing the standard color vector of each pixel by said ratio in each pixel in the initial image of the fourth image so as to generate a fifth image.

6. A method of simulating an image according to claim 1, wherein said step of determining the standard color vector comprises:

calculating a second mean color vector from pixels surrounding each pixel including surrounding pixels outside said object area; and substituting the second mean color vector for the standard color vector.

7. A method of simulating an image according to claim 6, wherein said step of calculating the second mean color vector further comprises the step of:

setting a square area with a side of n pixels, said square area having a center located at the specified pixel, re-calculating the mean color vector in the square area by incrementing the n two by two starting at 1 until a difference between said mean color vector and a previous mean color vector becomes less than a predetermined threshold value; and replacing the mean color vector with a final mean color vector.

8. A method of simulating an image in a system having an image input means, an image output means, a processor, and a means for performing image simulation of an object area for reconstructing an image having at least one color component, the method comprising the steps of:

inputting a first image with said image input means, the first image being divided into pixels and having a least one region with a common texture;

determining a standard color vector for each pixel in the object area of said first image;

calculating a mean color vector corresponding to each of the pixels in said object area;

calculating, for each pixel in the object area, a ratio of its mean color vector to its standard color vector;

generating a second image from said object area by changing the color vectors of the pixels in at least one region of said object area;

adjusting the color vectors of the pixels of said second image corresponding to each pixel in the at least one region in said object area, with said ratios corresponding to each of the pixels;

generating a third image using the adjusted color vectors from the color vector adjusting step; and outputting said third image with said image output means.

9. A method for simulating an image in a system having an image input means, an image output means, a processor, and a means for performing image simulation of an object area of an image, the method comprising the steps of:

inputting a first image with said image input means;

texture-mapping another image from which a global shadow and shade are removed into said object area of said first image;

extracting at least one of a light source color vector and an object body color vector for each of the pixels in the object area of said first image for simulation;

expressing a pixel color vector for each pixel in said object area as a linear sum of said light source an object body color vectors;

generating a second image by changing the pixel color vectors of at least a part of the pixels in said object area of the first image, including the steps of:

determining standard color vectors of the first image;

setting a square area with a side of n pixels surrounding each pixel of the first image;

calculating a mean color vector from the color vectors of each pixel in the square;

repeating the process of calculating the mean color vector in the area by incrementing n two by two starting at 1 until difference between said mean color vector and a previous mean color vector becomes less than a predetermined threshold value;

after the difference becomes less than the threshold value, calculating a ratio of said mean color vector to the standard color vector of each pixel; and dividing the color vector by said ratio in each pixel of the first image to generate the shroud image;

reconstructing said linear sum by replacing said object body color vector of each pixel in said object area of said first image with the color vector of the corresponding pixel of said second image and using each of the pixel color vectors of the second image as the pixel color vector of the corresponding pixel to generate a third image; and outputting said third image.

10. A method for simulating an image in a system having an image input means, an image output means, a processor, and a means for performing image simulation of the object area of a color or monochromatic image, the method comprising the steps of:

inputting a first image with said image input means;

setting a square area with a side of n pixels around each pixel of the object area of said image;

calculating a mean color vector in the square area, after each mean color vector calculation, incrementing the n two by two starting at 1 and recalculating the mean color vector until a difference between the calculated mean color vector and a previously calculated mean color vector becomes less than a predetermined threshold value;

extracting at least one of a light source vector and an object body vector based on the calculated mean color vectors;

expressing a color vector for each pixel in said object area as a linear sum of said light source and object body vectors;

generating a second image by changing the pixel color vectors of at least a part of the pixels in said object area;

reconstructing said linear sum by replacing said object body vector of each pixel in said object area with the pixel color vector of the corresponding pixel of said second image and using each of the pixel color vectors of the second image as the pixel color vector of the corresponding pixel to generate a third image; and outputting said third image.

11. A method of mapping an image in a system having an image input means, an image output means, a processor, and a means for transforming and mapping images, the method comprising the steps of:

inputting a perspective projection in a three-dimensional space including at least a plane, as a first image with said image input means, said first image having a repetitive pattern of a plurality of similar image areas which are originally on the same plane in the three-dimensional spaces;

calculating transformation parameters for transforming coordinate values of at least four points on the plane into calculated coordinate values in said image areas;

comparing said calculated coordinate values of the four points on the plane and a true coordinate value of a true corresponding position on the plane;

recalculating said parameters in accordance with the comparison of the calculated and true coordinate values;

generating a second image for mapping into said plurality of areas; and mapping each pixel in said second image into a pixel in said image areas of said first image in accordance with said transformation parameters to generate a third image.

12. A method of mapping an image according to claim 11, wherein the step of calculating transform parameters further includes disordering said calculated coordinate values and using said disoriented calculated value for setting the parameters for projection transformation.

13. A method of mapping an image according to claim 12, wherein the step of mapping each pixel further determines to perform the mapping for each pixel by referencing data indicating whether each said pixel is to be mapped.

14. A method of mapping an image according to claim 11, wherein whether to perform the mapping for each pixel is determined by referencing held data which indicates whether each pixel is to be mapped.

15. A method of mapping an image according to claim 11, further including determining whether to perform the mapping for each pixel by referencing a table which indicates whether each pixel is to be mapped.

* * * * *